US012573026B2

(12) United States Patent
Tanaka

(10) Patent No.: US 12,573,026 B2
(45) Date of Patent: Mar. 10, 2026

(54) INSPECTION SYSTEM, INSPECTION APPARATUS, CONTROL METHOD THEREFOR, AND STORAGE MEDIUM THAT EXECUTE INSPECTION BY COMPARING AN IMAGE OF A PRINTED MATERIAL AND A REFERENCE IMAGE

(71) Applicant: CANON KABUSHIKI KAISHA, Tokyo (JP)

(72) Inventor: Hirotomo Tanaka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 450 days.

(21) Appl. No.: 18/180,254

(22) Filed: Mar. 8, 2023

(65) Prior Publication Data

US 2023/0306586 A1     Sep. 28, 2023

(30) Foreign Application Priority Data

Mar. 25, 2022     (JP) ................................. 2022-050455

(51) Int. Cl.
*G06T 7/00*          (2017.01)
*G06V 10/25*         (2022.01)
*H04N 1/00*          (2006.01)

(52) U.S. Cl.
CPC .............. *G06T 7/001* (2013.01); *G06V 10/25* (2022.01); *H04N 1/00005* (2013.01); *H04N 1/00029* (2013.01); *G06T 2207/30144* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 2010/0021001 A1 | 1/2010 | Hosinger et al. | |
| 2014/0092419 A1* | 4/2014 | Yamagishi | ......... H04N 1/00047 |
| | | | 358/1.14 |
| 2018/0293732 A1* | 10/2018 | Oki | .......................... G06T 7/001 |
| 2021/0141577 A1* | 5/2021 | Ito | .......................... G06F 3/1256 |

FOREIGN PATENT DOCUMENTS

JP          2021-078082 A          5/2021

OTHER PUBLICATIONS

Exteneded European Search Report issued on Aug. 21, 2023, in corresponding European Patent Application No. 23160647.6 (8 pages).

* cited by examiner

*Primary Examiner* — Darryl V Dottin
(74) *Attorney, Agent, or Firm* — Venable LLP

(57)          ABSTRACT

An inspection system includes a printing apparatus and an inspection apparatus that executes an inspection by comparing an image of a printed material printed by the printing apparatus and a reference image, the inspection apparatus including one or more memory devices that store a set of instructions and one or more processors that execute the set of instructions to extract, from an image of the printed material, a region corresponding to a content type on a basis of content information of the reference image, the content type indicating attribution of an image of the printed material, to set an inspection level based on a corresponding type for each extracted region, to present, to a user, the extracted region and the set inspection level, associated with the reference image, and to inspect the extracted region using the reference image and the set inspection level.

20 Claims, 17 Drawing Sheets

F I G. 1
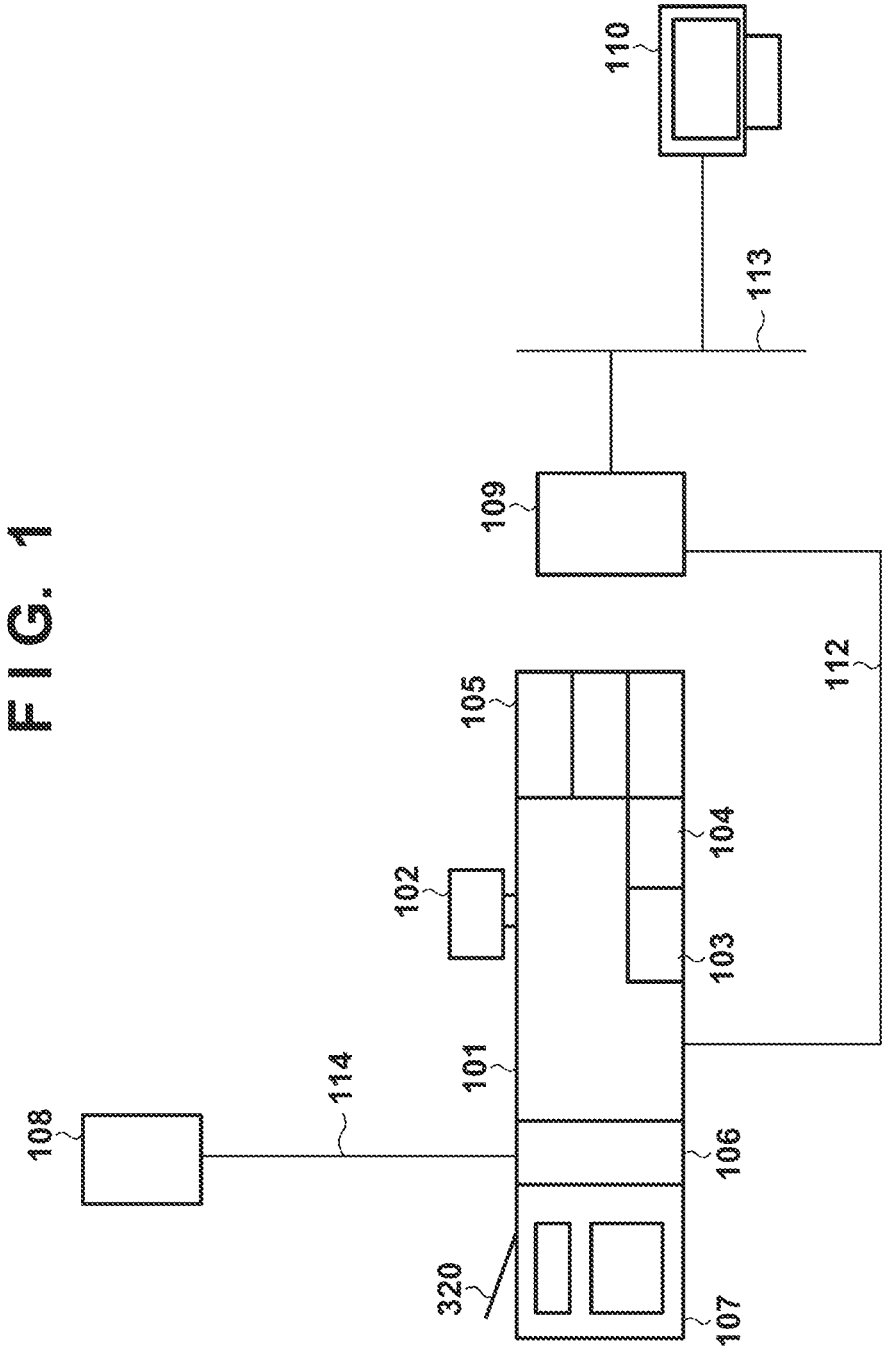

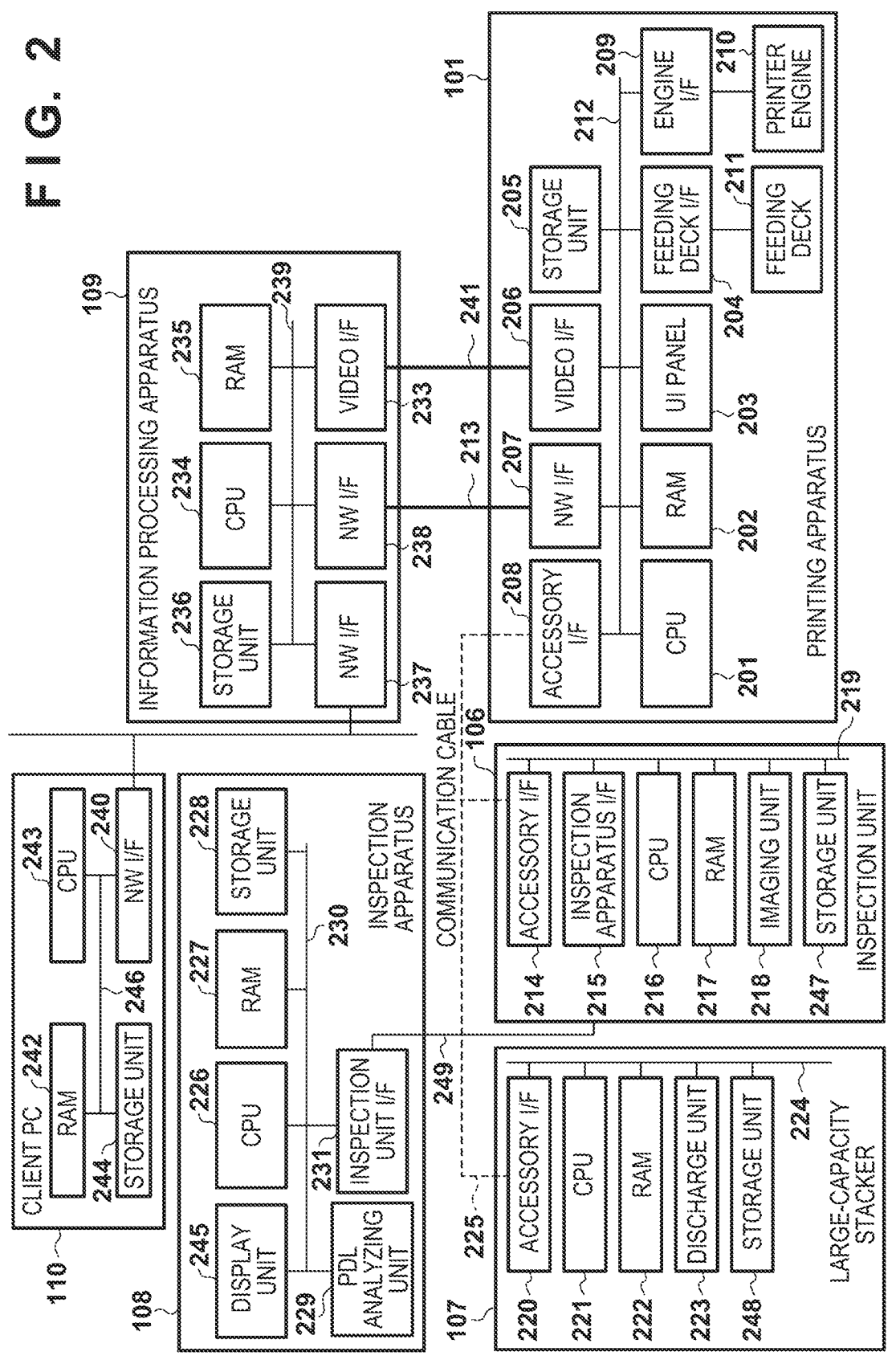
F I G. 2

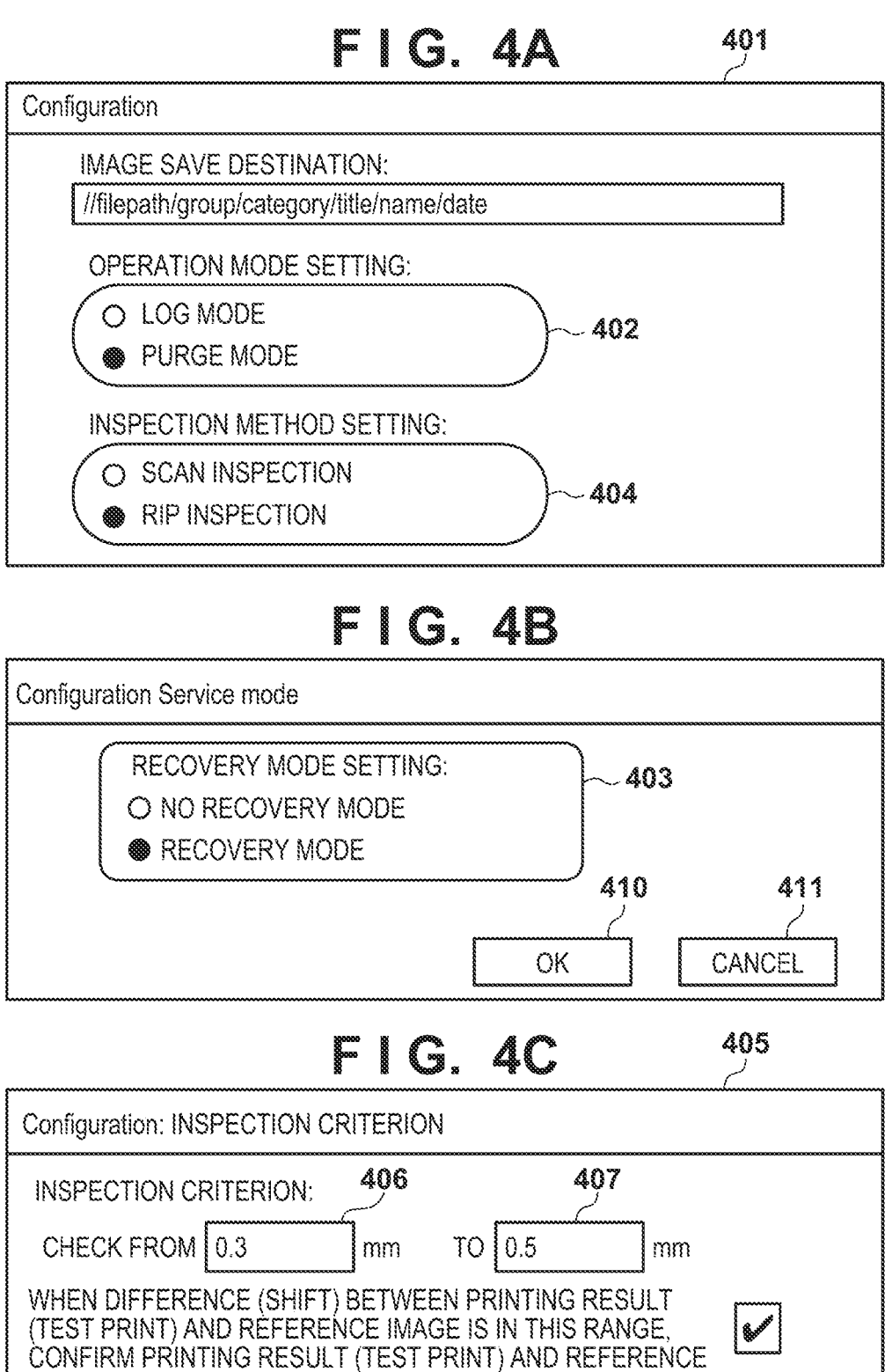

401

Configuration

IMAGE SAVE DESTINATION:

//filepath/group/category/title/name/date

OPERATION MODE SETTING:

○ LOG MODE
● PURGE MODE

402

INSPECTION METHOD SETTING:

○ SCAN INSPECTION
● RIP INSPECTION

Configuration Service mode

RECOVERY MODE SETTING:
○ NO RECOVERY MODE
● RECOVERY MODE

403

410          411

OK          CANCEL

Configuration: INSPECTION CRITERION

INSPECTION CRITERION: 406          407

CHECK FROM 0.3 mm    TO 0.5 mm

WHEN DIFFERENCE (SHIFT) BETWEEN PRINTING RESULT
(TEST PRINT) AND REFERENCE IMAGE IS IN THIS RANGE,
CONFIRM PRINTING RESULT (TEST PRINT) AND REFERENCE
IMAGE                                                    ☑

PUT RESULT IN LOG.                                       ☑

FIG. 5

INSPECTION STATUS    501

INSPECTION_yyy/mm/dd.pdf

INSPECTION IN PROGRESS   503

STOP INSPECTION   502

| INSPECTED: | FAILED: | FAILURE RATE: |
|---|---|---|
| 100 | 2 | 2% |

| MISALIGNMENT | CIRCULAR DEFECT: | STREAK-SHAPED DEFECT: | ERROR: |
|---|---|---|---|
| 0 | 1 | 0 | 1 |

504

| SHEET No | FRONT/BACK | MISALIGNMEN | CIRCULAR DEFECT | STREAK-SHAPED DEFECT | ERROR | EXAMINATION DATE | DETAIL DISPLAY |
|---|---|---|---|---|---|---|---|
| 22 | FRONT | OK | OK | OK | NG | 2020/8/20 18:22:55 | DETAILS |
| 50 | BACK | OK | NG | OK | — | 2020/8/20 18:24:49 | DETAILS |
|  |  |  |  |  |  |  |  |

F I G.  6
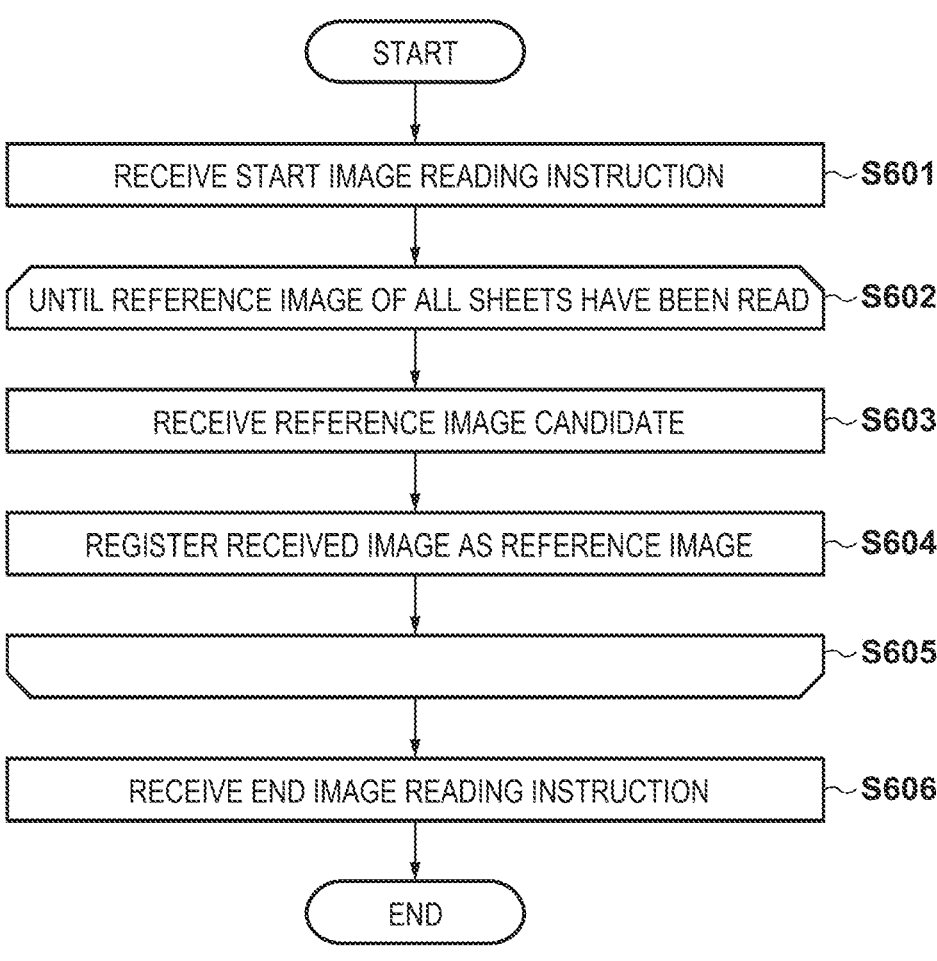

F I G. 8

801         802        800

| CONTENT TYPE | INSPECTION LEVEL | |
|---|---|---|
| Text | LEVEL 1 | ▼ |
| Graphics | LEVEL 2 | ▼ |
| Image | LEVEL 3 | ▼ |

CANCEL        OK 803         804

F I G. 9A

900

| CONTENT TYPE | INSPECTION LEVEL |
|---|---|
| Graphics | LEVEL 2 |
| Image | LEVEL 3 |
| Text | LEVEL 1 |

F I G. 9B 907         908        901

| INSPECTION LEVEL | THRESHOLD | | |
|---|---|---|---|
| | CIRCULAR DEFECT | STREAK-SHAPED DEFECT | MISALIGNMEN |
| LEVEL 1 | FROM 0.5mm TO 1.0mm | | |
| LEVEL 2 | FROM 0.3mm TO 0.5mm | | |
| LEVEL 3 | 0.3mm OR LESS | | |

F I G.  9C

| REGION | CONTENT TYPE | INSPECTION LEVEL |
|---|---|---|
| GRAPHIC REGION | Graphics | LEVEL 2 |
| IMAGE REGION | Image | LEVEL 3 |
| TEXT REGION | Text | LEVEL 1 |

909   910   902

F I G.  9D

903

| REGION | CONTENT TYPE | INSPECTION LEVEL |
|---|---|---|
| REGION 1 | Graphics | LEVEL 2 |
| REGION 2 | Graphics | LEVEL 2 |
| REGION 3 | Image | LEVEL 3 |
| REGION 4 | Text | LEVEL 1 |
| REGION 5 | Image | LEVEL 3 |
| REGION 6 | Image | LEVEL 3 |
| REGION 7 | Graphics | LEVEL 2 |
| REGION 8 | Graphics | LEVEL 2 |

F I G.  9E

915   904

| REGION GROUP | REGION | CONTENT TYPE | INSPECTION LEVEL |
|---|---|---|---|
| GRAPHIC 1 | REGION 1 | Graphics | LEVEL 2 |
| | REGION 2 | Graphics | LEVEL 2 |
| IMAGE 1 | REGION 3 | Image | LEVEL 3 |
| | REGION 4 | Image | LEVEL 3 |
| | REGION 5 | Image | LEVEL 3 |
| | REGION 6 | Image | LEVEL 3 |
| | REGION 7 | Image | LEVEL 3 |
| TEXT 1 | REGION 8 | Text | LEVEL 1 |
| IMAGE 2 | REGION 9 | Image | LEVEL 3 |
| | REGION 10 | Image | LEVEL 3 |
| | REGION 11 | Image | LEVEL 3 |
| | REGION 12 | Image | LEVEL 3 |
| GRAPHIC 2 | REGION 13 | Graphics | LEVEL 2 |
| | REGION 14 | Graphics | LEVEL 2 |

F I G. 10A
REFERENCE IMAGE  1001  1005
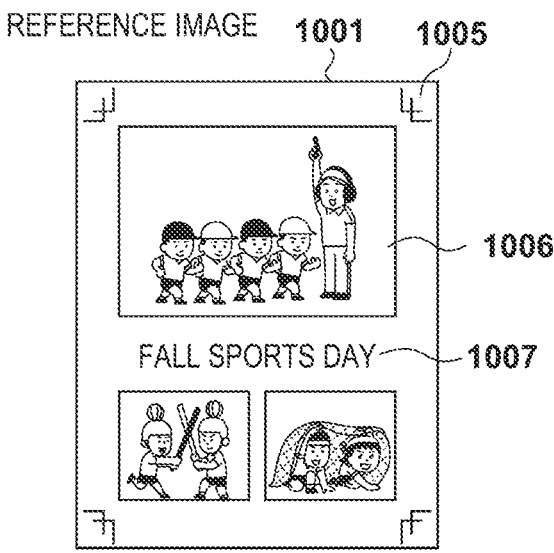
1006
FALL SPORTS DAY —1007
F I G. 10B
CONTENT INFORMATION
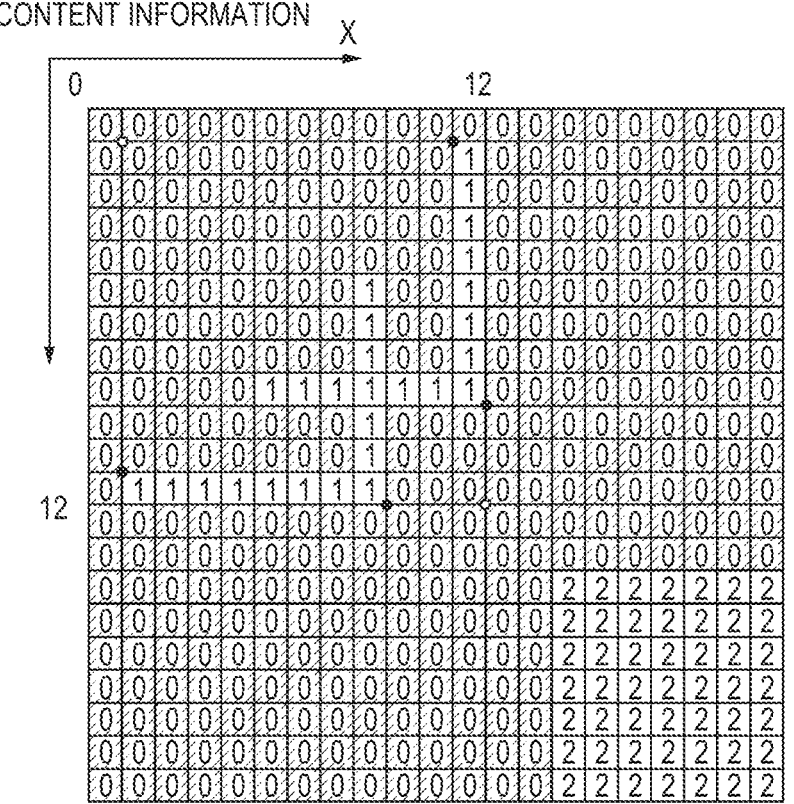

FIG. 10C
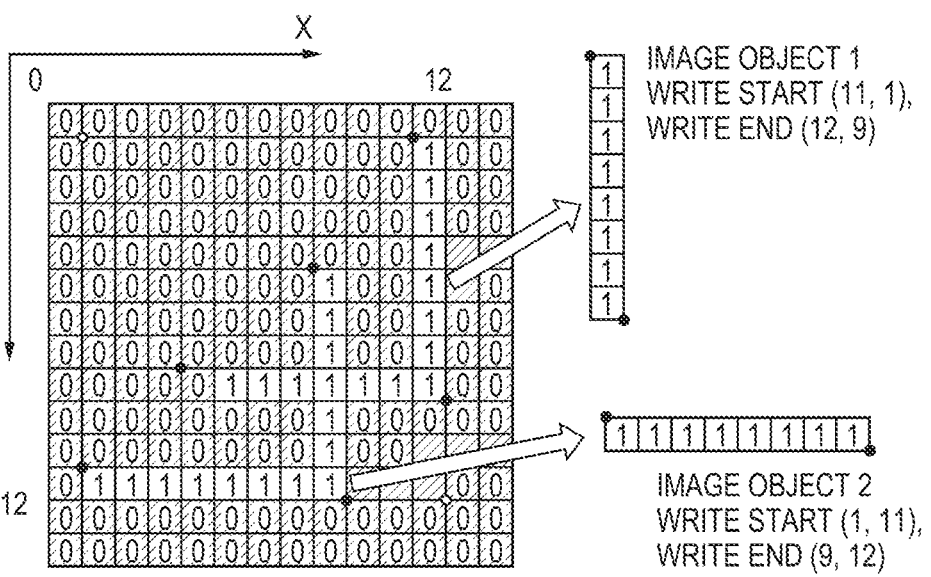
IMAGE OBJECT 1
WRITE START (11, 1),
WRITE END (12, 9)
IMAGE OBJECT 2
WRITE START (1, 11),
WRITE END (9, 12)
FIG. 10D
FIG. 10E
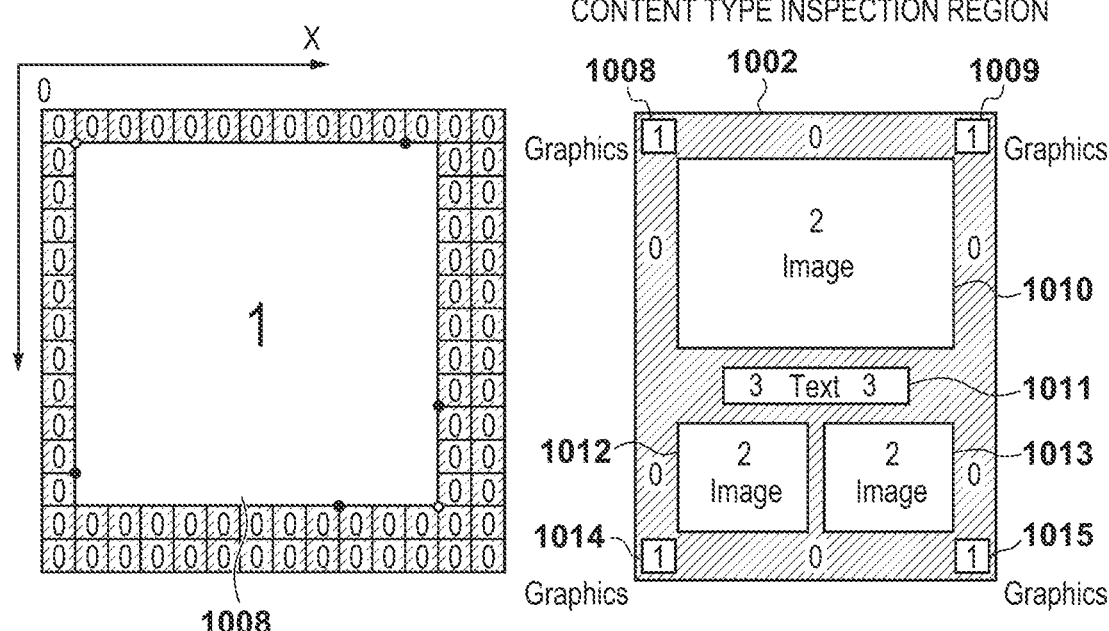

F I G. 11
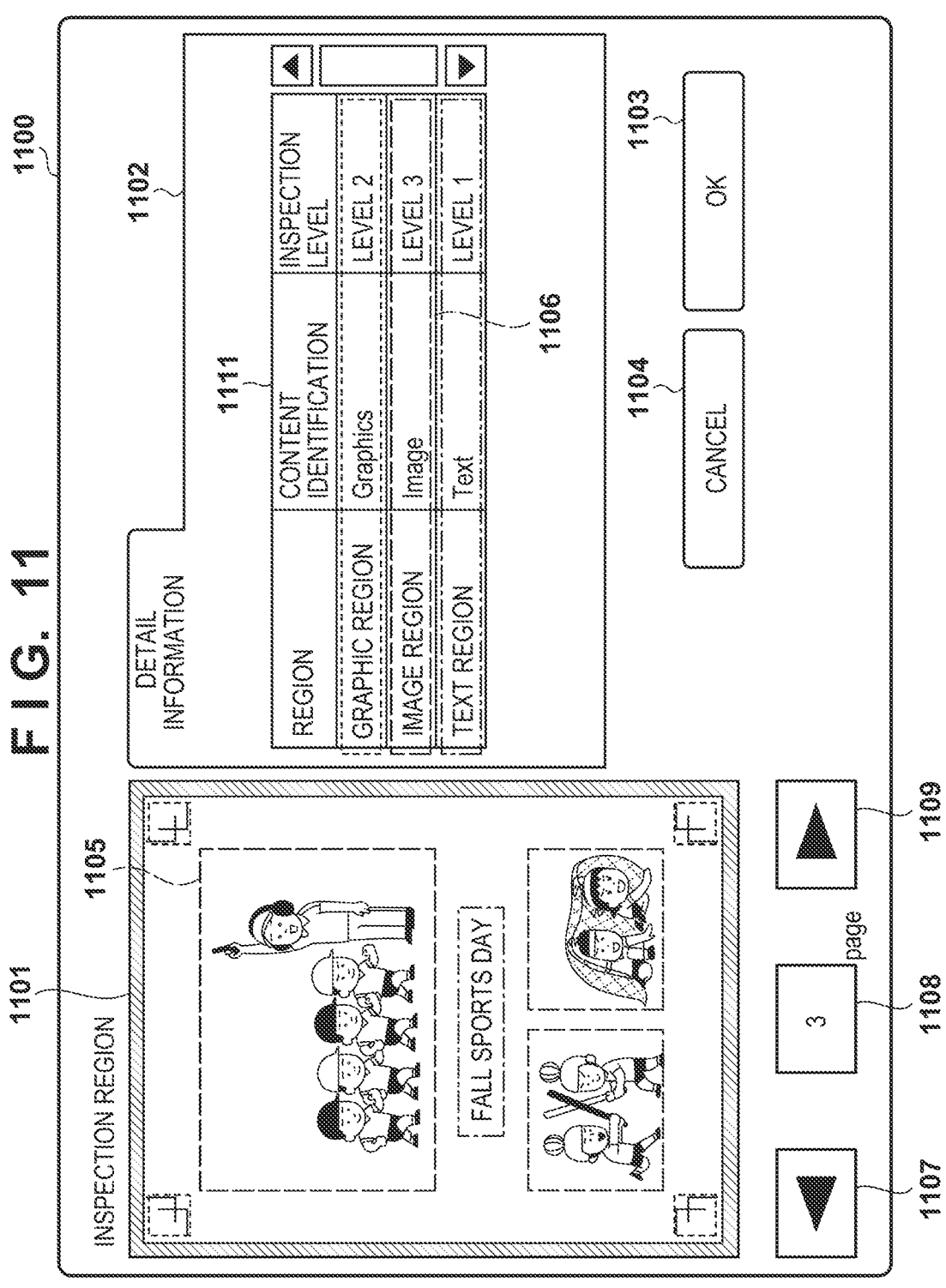

F I G. 12A

START

↓ S1201

OBTAIN SET INSPECTION SETTINGS

↓ S1202

OBTAIN CONTENT INFORMATION

↓ S1203

UNTIL LAST OF CONTENT INFORMATION HAS BEEN OBTAINED

↓ S1204

RECOGNIZE CONTENT TYPE, EXTRACT INDEPENDENT REGIONS, AND STORE CONTENT TYPE

↓ S1207

(empty box)

↓ S1208

ASSOCIATE INSPECTION LEVEL WITH EXTRACTED REGION

↓ S1209

UNTIL LAST OF REGION INFORMATION AND INSPECTION REGION SETTINGS HAVE BEEN READ

↓ S1210

DISPLAY UI IN INSPECTION REGION

↓ S1211

DISPLAY INSPECTION REGION SETTINGS FOR REGION ON UI

↓ S1212

(empty box)

↓

END

F I G. 12B

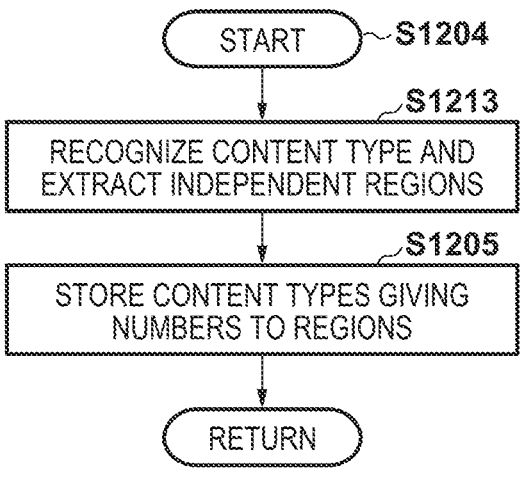

START ~ S1204

↓ S1213

RECOGNIZE CONTENT TYPE AND EXTRACT INDEPENDENT REGIONS

↓ S1205

STORE CONTENT TYPES GIVING NUMBERS TO REGIONS

↓

RETURN

F I G. 12C

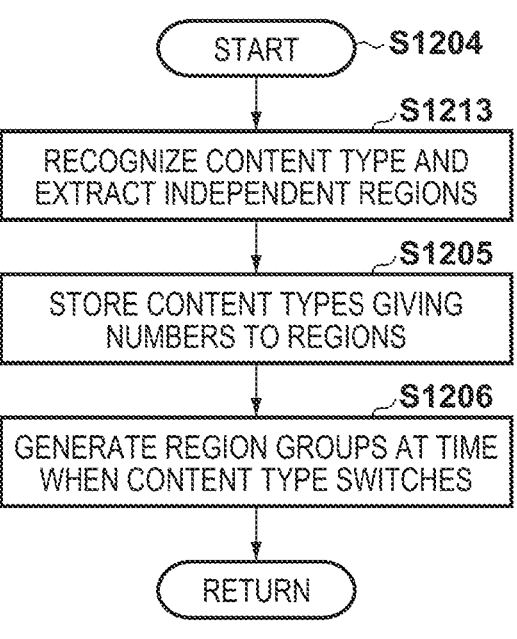

START ~ S1204

↓ S1213

RECOGNIZE CONTENT TYPE AND EXTRACT INDEPENDENT REGIONS

↓ S1205

STORE CONTENT TYPES GIVING NUMBERS TO REGIONS

↓ S1206

GENERATE REGION GROUPS AT TIME WHEN CONTENT TYPE SWITCHES

↓

RETURN

F I G. 13B
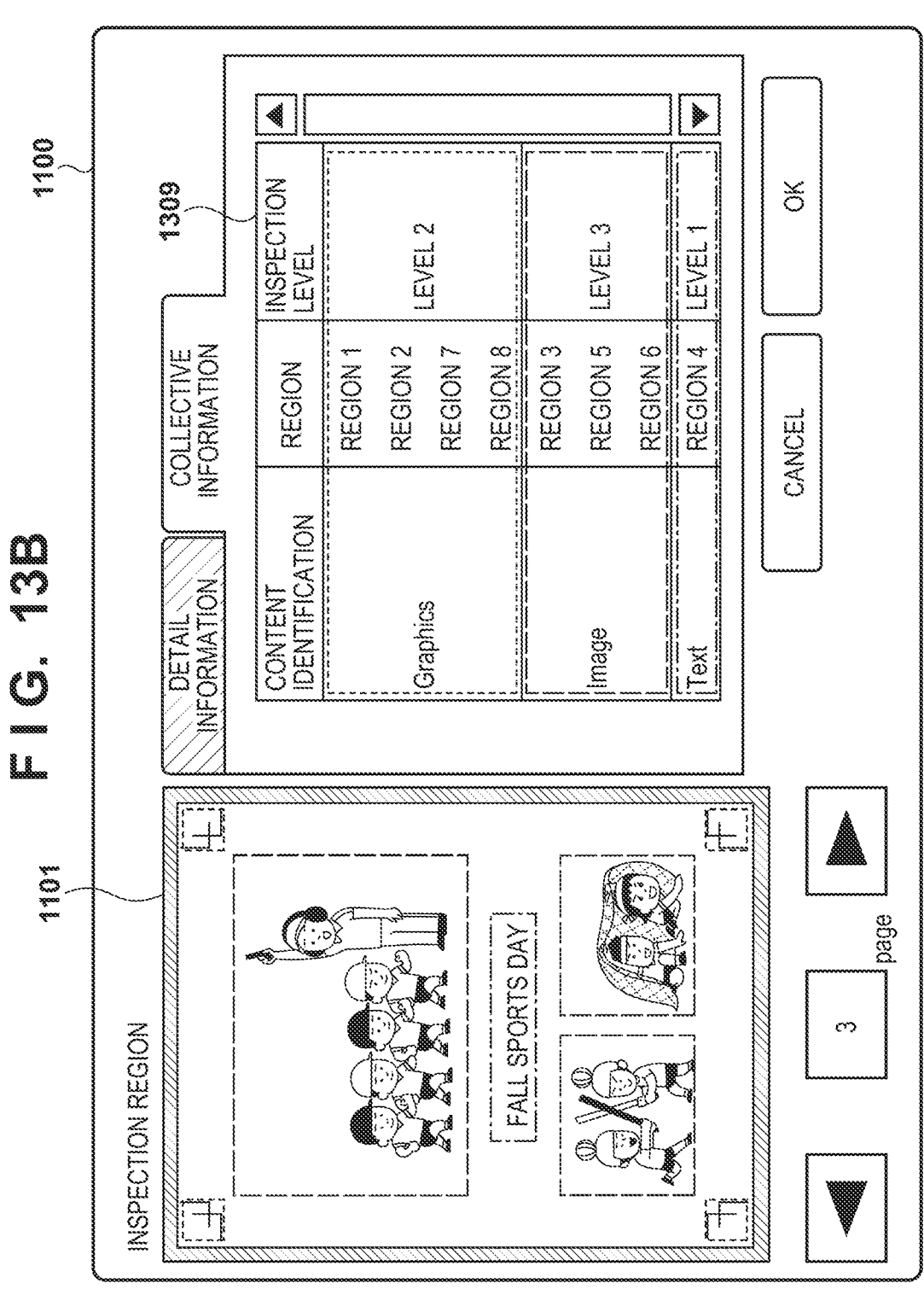

F I G. 14A
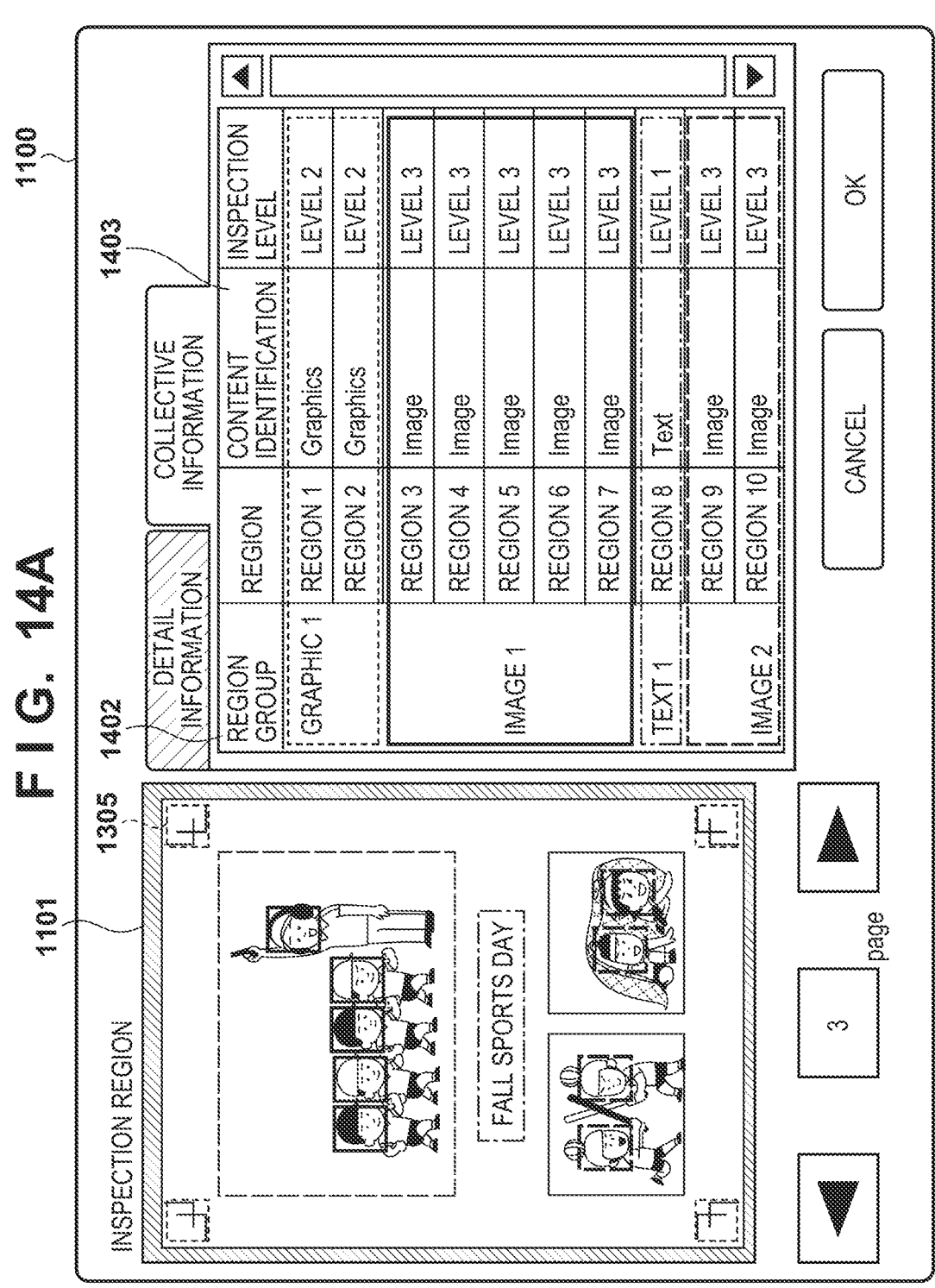
| REGION GROUP | REGION | CONTENT IDENTIFICATION | INSPECTION LEVEL |
|---|---|---|---|
| GRAPHIC 1 | REGION 1 | Graphics | LEVEL 2 |
|  | REGION 2 | Graphics | LEVEL 2 |
| IMAGE 1 | REGION 3 | Image | LEVEL 3 |
|  | REGION 4 | Image | LEVEL 3 |
|  | REGION 5 | Image | LEVEL 3 |
|  | REGION 6 | Image | LEVEL 3 |
|  | REGION 7 | Image | LEVEL 3 |
| TEXT 1 | REGION 8 | Text | LEVEL 1 |
| IMAGE 2 | REGION 9 | Image | LEVEL 3 |
|  | REGION 10 | Image | LEVEL 3 |
INSPECTION REGION
FALL SPORTS DAY
3    page
OK    CANCEL

FIG. 14B

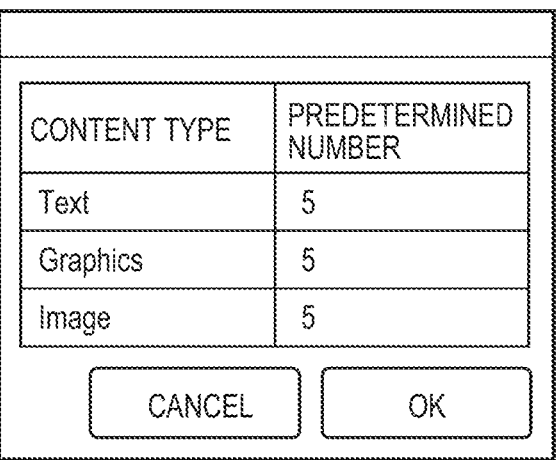

| CONTENT TYPE | PREDETERMINED NUMBER |
|---|---|
| Text | 5 |
| Graphics | 5 |
| Image | 5 |

CANCEL　　OK

FIG. 15

S706 — ( COMPARE RECEIVED IMAGE AND REFERENCE IMAGE )

S1501 — OBTAIN REGION INFORMATION AND INSPECTION REGION SETTINGS

S1502 — UNTIL LAST OF REGION INFORMATION AND INSPECTION REGION SETTINGS HAVE BEEN READ

S1503 — COMPARE REFERENCE IMAGE REGION AND REGION CORRESPONDING TO IMAGE TO BE INSPECTED

S1504 — IS DIFFERENCE LESS THAN OR EQUAL TO INSPECTION LEVEL?

NO

YES

S1506 — DETERMINE INSPECTION TO BE FAIL FOR THAT REGION

S1505 — DETERMINE INSPECTION TO BE PASS FOR THAT REGION

S1507

S1508 — DETERMINE QUALITY OF IMAGE TO BE INSPECTED ( RETURN )

INSPECTION SYSTEM, INSPECTION APPARATUS, CONTROL METHOD THEREFOR, AND STORAGE MEDIUM THAT EXECUTE INSPECTION BY COMPARING AN IMAGE OF A PRINTED MATERIAL AND A REFERENCE IMAGE

CROSS-REFERENCE TO PRIORITY APPLICATION

This application claims the benefit of Japanese Patent Application No. 2022-050455, filed Mar. 25, 2022, which is hereby incorporated by reference herein in its entirety.

BACKGROUND OF THE INVENTION

Field of the Invention

The present invention relates to an inspection system, an inspection apparatus, a control method therefor, and a storage medium.

Description of the Related Art

A known inspection apparatus reads a printed material printed by a printing apparatus and inspects the quality of the image printed on the printed material. The inspection apparatus can detect image defects, such as marks and print omissions. Regarding such image defects, typically, the type of defect is detected and, for each detected type, a threshold for detecting a defect as an image failure can be set. For example, for circular image defects, typically, a threshold of a diameter of a few millimeters or greater can be set for determining an image failure.

For such inspections, a method is used that includes using an image without defects referred to as a reference image as a comparison target and comparing the reference image and an image on a printed material. The reference image in such cases is obtained by printing and scanning in advance one or a plurality of inspection target print jobs, having a user confirm that there are no marks or character errors on the number of articles printed, and then scanning the printed materials to obtain image data as the reference image.

Also, in such inspections, since the print quality required varies depending on the user and the print job, the region and threshold (in terms of an application, the inspection threshold is referred to as the inspection level, and higher levels mean that smaller defects can be detected) for inspection can preferably be set. For example, when printing a photo album of a sports day, a holiday, or the like, the customer focuses on the faces of people, and thus marks on the face portion are preferably detected. Also, for fine characters, an inspection region may wish to be set so that whether the fine lines are printed up to expectations can be inspected. In Japanese Patent Laid-Open No. 2021-078082, a technique is described for specifying a region to be inspected and an inspection level for a reference image via a user input.

However, with the known techniques, the inspection region and inspection level are specified and accepted via a manual input by the user, required effort from the user. Also, as the number of inspection sections increases, more time is required to specify the inspection region and the inspection level.

An object of the present invention is to solve at least one of the problems in known techniques described above.

SUMMARY OF THE INVENTION

The present invention enables realization of a technique for automatically setting the inspection regions and the inspection levels on the basis of information included in a reference image.

One aspect of the present invention provides an inspection system comprising a printing apparatus and an inspection apparatus that executes an inspection by comparing an image of a printed material printed by the printing apparatus and a reference image, wherein the inspection apparatus comprises an extracting unit that extracts a region corresponding to a content type on a basis of content information of the reference image, a first setting unit that sets an inspection level for the region extracted by the extracting unit, and a presenting unit that presents, to a user, the region extracted by the extracting unit and the inspection level set by the first setting unit, associated with the reference image.

Another aspect of the present invention provides an inspection apparatus that executes an inspection by comparing an image of a printed material printed by a printing apparatus and a reference image, comprising an extracting unit that extracts a region corresponding to a content type on a basis of content information of the reference image, a first setting unit that sets an inspection level for the region extracted by the extracting unit, and a presenting unit that presents, to a user, the region extracted by the extracting unit and the inspection level set by the first setting unit, associated with the reference image.

Still another aspect of the present invention provides an inspection apparatus that executes an inspection by comparing an image of a printed material printed by a printing apparatus and a reference image, comprising a setting unit that sets a predetermined inspection level for a region corresponding to a predetermined content type in an image of the printed material on a basis of content information of the reference image and an inspecting unit that inspects the region using the reference image and the inspection level set by the setting unit.

Yet still another aspect of the present invention provides a control method for controlling an inspection apparatus that executes an inspection by comparing an image of a printed material printed by a printing apparatus and a reference image, comprising extracting a region corresponding to a content type on a basis of content information of the reference image, setting an inspection level for the region extracted in the extracting, and presenting, to a user, the region extracted in the extracting and the inspection level set in the setting, associated with the reference image.

Still yet another aspect of the present invention provides a non-transitory computer-readable storage medium storing a computer program for causing a computer to execute a control method for controlling an inspection apparatus that executes an inspection by comparing an image of a printed material printed by a printing apparatus and a reference image, wherein the control method includes extracting a region corresponding to a content type on a basis of content information of the reference image, setting an inspection level for the region extracted in the extracting, and presenting, to a user, the region extracted in the extracting and the inspection level set in the setting, associated with the reference image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a diagram illustrating the configuration of an inspection system according to a first embodiment of the present invention.

FIG. 2 is a block diagram for describing the configuration of a printing apparatus, an inspection apparatus, a large-capacity stacker, an information processing apparatus, and a client computer according to the first embodiment.

FIG. 3 is a schematic cross-sectional view for describing the internal configuration of the printing apparatus, the inspection unit, and the large-capacity stacker according to the first embodiment.

FIGS. 4A to 4C are diagrams illustrating examples of screens where inspection settings displayed by the inspection apparatus according to the first embodiment are set.

FIG. 5 is a diagram illustrating an example of an inspection status screen displayed on the display unit when an inspection is executed by an inspection apparatus according to the first embodiment.

FIG. 6 is a flowchart for describing the processing when the inspection apparatus according to the first embodiment registers a reference image.

FIG. 8 is a diagram illustrating an example of an inspection level settings screen for setting the inspection level of the content types when the inspection apparatus according to the first embodiment executes an inspection.

FIGS. 9A to 9E are diagrams illustrating examples of inspection settings, inspection levels, and inspection region settings tables according to the first embodiment.

FIGS. 10A to 10E are diagrams illustrating examples of a reference image and content information generated according to the first embodiment.

FIG. 11 is a diagram illustrating an example of a screen for showing a user inspection regions for the inspection apparatus according to the first embodiment.

FIGS. 12A to 12C illustrate flowchart (A) for describing the processing when setting the inspection region executed by the inspection apparatus according to the first embodiment, flowchart (B) for describing the processing executed in place of step S1204 by an inspection apparatus according to a second embodiment, and a flowchart (C) for describing the processing executed in place of step S1204 in a third embodiment.

FIGS. 13A and 13B are diagrams illustrating examples of screens displayed to the user of a plurality of different inspection regions with the same content type by the inspection apparatus according to the second embodiment.

FIGS. 14A and 14B are diagrams illustrating examples of a user interface screen displayed on a display unit of an inspection apparatus according to the third embodiment.

FIG. 15 is a flowchart for describing the processing when inspection is executed by the inspection apparatus according to the first embodiment comparing an inspection target image and a reference image.

DESCRIPTION OF THE EMBODIMENTS

Figure 7:
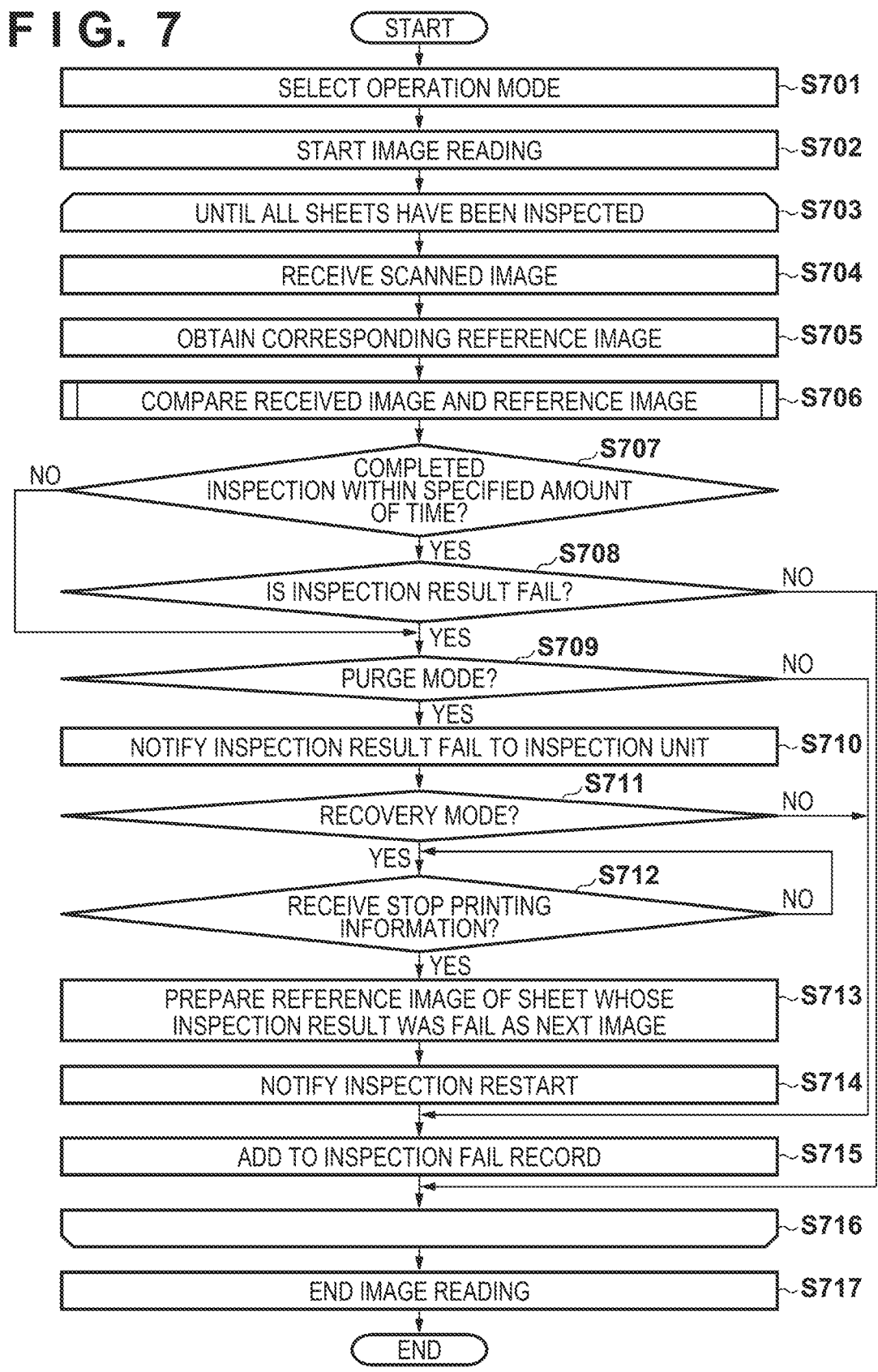
FIG. 7 is a flowchart for describing the inspection processing executed by the inspection apparatus according to the first embodiment.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that, unless otherwise stated, as long as the functions according to the present invention can be implemented, the inspection apparatus may be a single device or may include a plurality of devices. Also, unless otherwise stated, as long as the functions of the present invention can be implemented, the inspection apparatus may execute processing while connected to a network, such as a Local Area Network (LAN), a Wide Area Network (WAN), or the like. In other words, the system configuration with various types of terminals connected described in the following embodiments is an example, and, naturally, various configuration examples may be used depending on the application and purpose.

FIG. 1 is a diagram illustrating the configuration of an inspection system according to a first embodiment of the present invention.

The inspection system includes an information processing apparatus 109, an inspection apparatus 108, a printing apparatus 101, and a client computer 110. Note that the printing apparatus 101 according to the first embodiment described below is an electrophotographic printing apparatus. However, the printing apparatus according to the first embodiment may use a different image forming method, such as the inkjet method and the offset method. The printing apparatus 101 is connected to the information processing apparatus 109 via a cable 112. The information processing apparatus 109 is connected to the client computer 110 via a network 113.

The printing apparatus 101 includes a UI panel 102, a feeding deck 103, and a feeding deck 104. Also, an optional deck 105 including a three-tier feeding deck is connected. The printing apparatus 101 is an electrophotographic printing apparatus, for example. Also, the UI panel 102 is a user interface including a capacitive touch panel, for example. Furthermore, the printing apparatus 101 includes an inspection unit 106 and a large-capacity stacker 107. The inspection unit 106 is connected to the inspection apparatus 108 via a cable 114. The large-capacity stacker 107 includes a main tray and a top tray 320, with thousands of sheets of paper being able to be loaded at once in the main tray.

A print job is generated at the client computer 110, transmitted to the information processing apparatus 109 via the network 113, and managed at the information processing apparatus 109. Then, the print job is transmitted from the information processing apparatus 109 to the printing apparatus 101 via the cable 112, and the printing apparatus 101 executes printing on a sheet. Note that, in another embodiment, the print job may be generated and managed at the information processing apparatus 109, transmitted to the printing apparatus 101 via the cable 112, and managed at the printing apparatus 101. Also, in another embodiment, the client computer 110, the information processing apparatus 109, and the inspection apparatus 108 may be connected by the cable 112 allowing for communication with the printing apparatus 101. Also, in another embodiment, the inspection apparatus 108 also may be connected to the information processing apparatus 109 and the client computer 110 via the network 113. In other words, how the printing apparatus 101, the information processing apparatus 109, and the client computer 110 are connected according to the first embodiment is an example, and, naturally, various modes of connection other than that of the first embodiment may be used. Also, in another embodiment, the printing apparatus 101 may be connected to, in addition to the inspection unit

106 and the large-capacity stacker 107, a finisher that can staple, a folding machine, a bookbinding machine, and the like.

FIG. 2 is a block diagram for describing the hardware configuration of the printing apparatus 101, the inspection apparatus 108, the large-capacity stacker 107, the information processing apparatus 109, and the client computer 110 according to the first embodiment.

First, the configuration of the printing apparatus 101 will be described.

A Central Processing Unit (CPU) 201 manages the control and calculations of each unit of the printing apparatus 101 using a system bus 212. The CPU 201 manages the execution of a program stored in a storage unit 205 and loaded on a Random Access Memory (RAM) 202. The RAM 202 is a common type of volatile storage apparatus that can be directly accessed from the CPU 201 and is used as a working area of the CPU 201 or as a temporary data storage area. The storage unit 205 functions as a temporary storage area or a working memory when operations of the printing apparatus are executed.

An engine I/F 209 manages the communications with a printer engine 210 and the control. A feeding deck I/F 204 manages the communications with a feeding deck 211 and the control. The feeding deck 211 is a generic term for the feeding decks 103 and 104 and the optional deck 105 in FIG. 1 as a hardware configuration. A UI panel 203 is a hardware configuration of the UI panel 102 in FIG. 1 and is a user interface for the overall operations of the printing apparatus 101. In the first embodiment, the UI panel 203 includes a capacitive touch panel.

A network interface (NWI/F) 207 is connected to an NWI/F 238 of the information processing apparatus 109 via a cable 213 and manages the communications of the printing apparatus 101 with the information processing apparatus 109. Note that, in this example, the interfaces connected to the system bus 212 and system bus 239 are directly connected. However, the mode of connection is not limited thereto, and the information processing apparatus 109 and the printing apparatus 101 may be connected via a network, or the like, for example. A video I/F 206 is connected to a video I/F 233 via a video cable 241 and manages the communication of image data between the information processing apparatus 109 and the printing apparatus 101.

Note that the connection interface of the information processing apparatus 109 with the printing apparatus 101 may integrate the functions of the NWI/F 238 and the video I/F 233. Also, the connection interface of the printing apparatus 101 with the information processing apparatus 109 may integrate the functions of the NWI/F 207 and the video I/F 206.

An accessory I/F 208 is connected to an accessory I/F 214 and an accessory I/F 220 via a cable 225. In other words, the printing apparatus 101 communicates with the inspection unit 106 and the large-capacity stacker 107 via the accessory I/Fs 208, 214, and 220.

Next, the configuration of the inspection unit 106 will be described.

A CPU 216 executes a program stored in a storage unit 247 and loaded on a RAM 217 and manages the control and calculations of each unit in the inspection unit 106 via a system bus 219. The RAM 217 is a common type of volatile storage apparatus that can be directly accessed from the CPU 216 and is used as a working area of the CPU 216 or as a temporary data storage area. The storage unit 247 functions as a temporary storage area or working memory when operations of the inspection apparatus 108 are executed. An inspection apparatus I/F 215 is connected to an inspection unit I/F 231 via a cable 249. In other words, the inspection unit 106 communicates with the inspection apparatus 108 via the inspection apparatus I/F 215 and the inspection unit I/F 231.

An imaging unit 218 includes an imaging function installed with a contact image sensor (CIS), for example, and captures an image of the sheet passing through the inside of the inspection unit 106 and transmits the captured image to the inspection apparatus 108 via the inspection apparatus I/F 215. Note that the CIS for the imaging unit 218 is an example of a sensor that may be used, with other examples including a CCD image sensor and the like. Also, the capture method is not limited thereto. There are two purposes for transmitting the captured image. The first is to capture an image of the printed material of the print job that is the inspection target and to transmit this to the inspection apparatus 108 for inspection, irrespective of the inspection method. The second is, when the inspection method is scan inspection, to print and capture an image of one or more print jobs previous to the print job that is the inspection target for generation of the reference image and to transmit the captured image data to the inspection apparatus 108 as the reference image. At the inspection apparatus 108, the transmitted image data is stored in a storage unit 228 as the reference image.

Next, the configuration of the large-capacity stacker 107 will be described.

A CPU 221 executes a program stored in a storage unit 248 and loaded on a RAM 222 and manages the control, calculations, and the like, of each unit in the large-capacity stacker 107 via a system bus 224. The RAM 222 is a common type of volatile storage apparatus that can be directly accessed from the CPU 221 and is used as a working area of the CPU 221 or as a temporary data storage area. The storage unit 248 functions as a temporary storage area or working memory when operations of the large-capacity stacker 107 are executed. A discharge unit 223 manages the discharge operation to the main tray and the top tray 320 and the monitoring and control of the load status of the main tray and the top tray 320.

Next, the configuration of the inspection apparatus 108 will be described.

A CPU 226 executes a program stored in the storage unit 228 and loaded on a RAM 227 and manages the control, calculations, and the like, of each unit of the inspection apparatus 108 via a system bus 230. The RAM 227 is a common type of volatile storage apparatus that can be directly accessed from the CPU 226 and is used as a working area of the CPU 226 or as a temporary data storage area. The storage unit 228 functions as a temporary storage area or working memory when operations of the inspection apparatus 108 are executed. A PDL analysis unit 229 reads Page Description Language (PDL) data, such as PDF, PostScript, PCL, or similar data, received from the client computer 110 or the information processing apparatus 109 and executes interpretation processing. A display unit 245 is a liquid crystal display, for example, connected to the inspection apparatus 108. The display unit 245 receives a user input for the inspection apparatus 108, displays the status of the inspection apparatus 108, and the like.

Next, the configuration of the information processing apparatus 109 will be described.

A CPU 234 executes a program stored in the storage unit 236 and loaded on a RAM 235 and executes the control, calculations, and the like, of each unit in the information processing apparatus 109 via a system bus 239. The RAM 235 is a common type of volatile storage apparatus that can be directly accessed from the CPU 234 and is used as a working area of the CPU 234 or as a temporary data storage area. The storage unit 236 functions as a temporary storage area or working memory when operations of the information processing apparatus 109 are executed. An NWI/F 237 is connected to an NWI/F 240 via a network, and the information processing apparatus 109 communicates with the client computer 110 via the NWI/F 237 and the NWI/F 240.

In another embodiment, the inspection apparatus 108 may include an NWI/F, and the information processing apparatus 109 may communicate with the inspection apparatus 108 via this NWI/F and the NWI/F 237. Take a case in which RIP inspection is used as the inspection method and a Raster Image Processor (RIP) image used by the printing apparatus 101 in printing is used as the reference image. In this case, the reference image may be transmitted to the inspection apparatus 108 via the inspection apparatus I/F 215. Alternatively, the reference image may be transmitted to the inspection apparatus 108 via an NWI/F included in the inspection apparatus 108 through the NWI/F 207 of the printing apparatus 101 or the NWI/F 237 of the information processing apparatus 109.

Next, the configuration of the client computer 110 according to the first embodiment will be described.

A CPU 243 executes a program stored in the storage unit 244 and loaded on a RAM 242 and executes the control, calculations, and the like, of each unit in the client computer 110 via a system bus 246. The RAM 242 is a common type of volatile storage apparatus that can be directly accessed from the CPU 243 and is used as a working area of the CPU 243 or as a temporary data storage area. The storage unit 244 functions as a temporary storage area or working memory when operations of the client computer 110 are executed.

Figure 3:
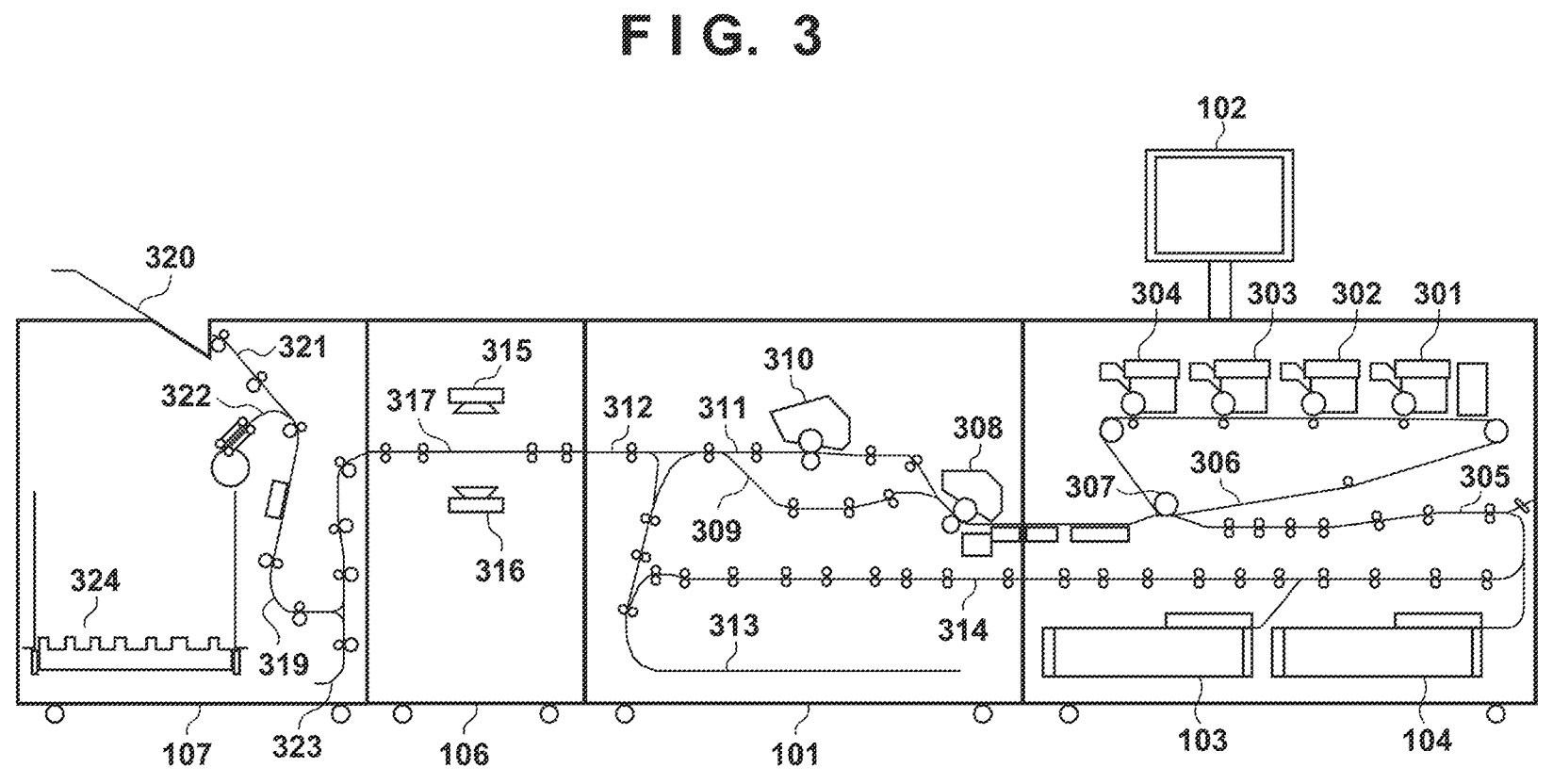

FIG. 3 is a schematic cross-sectional view for describing the internal configuration of the printing apparatus 101, the inspection unit 106, and the large-capacity stacker 107 according to the first embodiment.

The printing apparatus 101 receives a user input via the UI panel 102, displays the status of printing and the devices, and the like. Various types of sheets can be housed in the feeding decks 103 and 104. At each feeding deck, only the single most highest housed sheet can be separated from the other sheets and conveyed to a sheet conveyance path 305. Development stations 301 to 304 form a toner image to form a color image by using Y, M, C, and K colored toner. Here, the formed toner image is primary transferred to an intermediate transfer belt 306. The intermediate transfer belt 306 rotates in the clockwise direction in FIG. 3, and the toner image is transferred onto the sheet conveyed from the sheet conveyance path 305 at a secondary transfer position 307. A fixing unit 308 includes a pressure roller and a heating roller and, when the sheet passes between the rollers, fixes the toner image to the sheet via melting and compression bonding of the toner. The sheet after leaving the fixing unit 308 is conveyed to a conveyance path 312 via a sheet conveyance path 309. When further melting and compression bonding is required for fixing due to the type of the sheet, the sheet after leaving the fixing unit 308 is conveyed to a second fixing unit 310 using the sheet conveyance path described above, and the conveyed to the conveyance path 312 via a sheet conveyance path 311 after additional melting and compression bonding. Also, when double-sided is selected for the image forming mode, the sheet is conveyed to a sheet inverting path 313 where the sheet is inverted and then conveyed to a double-sided conveyance path 314.

Then, image transfer on the second side is performed at the secondary transfer position 307.

Inside the inspection unit 106, CISs 315 and 316 are disposed opposing one another. The CIS 315 is a sensor for reading the top surface of the sheet, and the CIS 316 is a sensor for reading the bottom surface of the sheet. The inspection unit 106 scans the sheet using the CISs 315 and 316 at the time that the sheet conveyed to a sheet conveyance path 317 arrives at a predetermined position. The image data obtained by scanning is transmitted to the inspection apparatus 108 via the inspection apparatus I/F 215 and the inspection unit I/F 231. The CPU 226 of the inspection apparatus 108 determines whether or not there is a defect in the scanned image data received in this manner and notifies the inspection unit 106 via the inspection unit I/F 231 and the inspection apparatus I/F 215 again of the determined result. The CPU 216 of the inspection unit 106 notifies the large-capacity stacker 107 via the accessory I/Fs 214 and 220 of the received determination result.

The large-capacity stacker 107 includes a main tray 324 as a tray where sheets are loaded. The sheet after leaving the inspection unit 106 is conveyed along a sheet conveyance path 319 and enters into the large-capacity stacker 107. The sheet is loaded onto the main tray 324 from the sheet conveyance path 319 via a sheet conveyance path 322. The large-capacity stacker 107 further includes the top tray 320 as a discharge tray. The CPU 221 discharges a sheet detected by the inspection apparatus 108 to have a defect to the top tray 320. When a sheet is output to the top tray 320, the sheet is conveyed to the top tray 320 from the sheet conveyance path 319 via a sheet conveyance path 321. An inverting unit 323 is used to invert the sheet. The inverting unit 323 is used when a sheet is loaded on the main tray 324. So that the orientation of sheets entering match the orientation of sheets when loaded, the inverting unit 323 inverts sheets once when the sheets are loaded on the main tray 324. The inverting operation at the inverting unit 323 is not performed when a sheet is conveyed to the top tray 320 as the sheet is discharged without being flipped when loaded.

FIGS. 4A to 4C are diagrams illustrating examples of screens where inspection settings displayed by the inspection apparatus 108 according to the first embodiment are set.

FIG. 4A is a diagram illustrating an example of a screen where the operation mode of the inspection apparatus 108 is set.

An operation mode settings screen 401 is displayed on the display unit 245 and receives operation mode settings from the user. In an operation mode setting portion 402, when "log mode" is selected, the printing apparatus 101 discharges the sheet after inspection to the discharge destination specified in advance by the properties of the print job, irrespective of the result of the inspection by the inspection apparatus 108.

On the other hand, when "purge mode" is selected in the operation mode setting portion 402, the printing apparatus 101 discharges sheets with fail for the inspection result to the top tray 320 of the large-capacity stacker 107. Also, when "scan inspection" is selected in an inspection method settings portion 404, the inspection apparatus 108 uses the image data obtained by scanning the printed material as the reference image to use in inspection. When "RIP inspection" is selected, the inspection apparatus 108 uses a RIP image (document data represented by page description language or the like, or image data analyzed and converted to a bitmap format printable by a printer) obtained by analyzing PDL data to be used in printing by the printing apparatus 101 as the reference image. The processing of generating and storing the reference image will be described below with reference to the flowchart in FIG. 6.

In FIG. 4A, "purge mode" is selected in the operation mode setting portion 402, and "RIP inspection" is selected in the inspection method settings portion 404.

FIG. 4B is a diagram illustrating an example of a purge mode recovery settings screen for the inspection apparatus 108.

When "purge mode" is selected in the operation mode setting portion 402, the recovery mode settings of a recovery mode setting portion 403 are reflected. The recovery mode setting portion 403 is displayed on the display unit 245 and receives the recovery mode settings from the user. When "no recovery mode" is selected in the recovery mode setting portion 403, the printing apparatus 101 discharges only sheets with fail for the inspection result to the top tray 320. Also, the printing apparatus 101 and the inspection apparatus 108 continue inspections as normal for the subsequent sheets.

On the other hand, when "recovery mode (recovery)" is selected in the recovery mode setting portion 403, the printing apparatus 101 discharges, to the top tray 320, sheets with fail for the inspection result and all subsequent sheets fed inside the apparatus at the point in time when the inspection apparatus 108 determined fail for the inspection result. Thereafter, when the sheets in the sheet conveyance path are gone, the printing apparatus 101 and the inspection apparatus 108 restart printing and inspecting from the image printed on the sheet with fail for the inspection result.

The inspection apparatus 108 according to the first embodiment captures an image with the CISs 315 and 316 of the inspection unit 106 while printing is performed by the printing apparatus 101 and an inspection is executed. Thus, after the inspection apparatus 108 determines fail for the inspection result for a sheet, there is a possibility that the subsequent sheets have already reached to sheet conveyance paths 309 and 311. However, the image printed on the sheet with fail for the inspection result cannot be re-printed and loaded in the correct output order at the discharge destination specified in advance by the print job unless all of the sheet conveyance path sheets have been discharged. According, in the "recovery mode", such operations are executed.

The CPU 226 notifies the inspection unit 106 of the operation mode, recovery mode, and inspection method set in the operation mode setting portion 402, the recovery mode setting portion 403, and the inspection method settings portion 404 in FIGS. 4A to 4C via the inspection unit I/F 231 and the inspection apparatus I/F 215. Note that the operation mode, recovery mode, and inspection method set in the operation mode setting portion 402, the recovery mode setting portion 403, and the inspection method settings portion 404 are stored in the RAM 227 by the CPU 226 and in the RAM 217 by the CPU 216.

In FIG. 4B, "recovery mode" is selected in the recovery mode setting portion 403.

FIG. 4C is a diagram illustrating an example of a settings screen for an inspection criterion for the inspection apparatus 108.

An inspection criteria screen 405 is displayed on the display unit 245 and receives the settings for the inspection criterion for the inspection apparatus 108 from the user. By selecting a not-illustrated inspection level on the inspection application, the settings screen for the inspection criterion is displayed for each inspection level described below. The inspection criterion is a criterion for failing the inspection and indicates the difference between the printing result and the reference image in terms of distance. In the first embodiment, the difference between the printing result and the reference image is represented by the difference between a RIP image and a printed material caused by misalignment or characteristics of the printing apparatus described below. The inspection apparatus 108 determines a pass for inspection when the difference between the printing result and the reference image is less than an upper limit reference value 406. The upper limit reference value 406 is used in both scan inspection and RIP inspection. A lower limit reference value 407 is enabled when the inspection method settings portion 404 is RIP inspection.

The processing according to the first embodiment described herein is for selecting a preferable reference image in order to reduce the difference between a RIP image and a printed material caused in the printing apparatus when RIP inspection is performed. This processing will be described below with reference the flowchart in FIG. 6.

When the inspection method settings portion 404 is RIP inspection, the inspection apparatus 108 determines whether or not the difference between the printing result material and the reference image is within a range ranging from the upper limit reference value 406 to the lower limit reference value 407. When it is determined that the different is within the range ranging from the upper limit reference value 406 to the lower limit reference value 407, the inspection apparatus 108 presents a selection screen for the reference image described below with reference to FIGS. 9A to 9E in order to receive determination by the user.

In the first embodiment, the difference between the printing result and the reference image is represented as an inspection criterion by a distance, however a different parameter such as color may be presented as the inspection criterion.

FIG. 5 is a diagram illustrating an example of an inspection status screen displayed on the display unit 245 when an inspection is executed by the inspection apparatus 108 according to the first embodiment.

An inspection status screen 501 is displayed on the display unit 245 and receives inspection execute and stop, displays the inspection status, and the like. An inspection button 502 receives inspection execute and inspection stop from the user. When the inspection button 502 is pressed, the character string on the button 502 changes to "stop inspection" and, an inspection status 503, changes to "inspection in progress". Then, when the inspection button 502 is pressed again, the character string on the button changes to "start inspection" and the inspection status 503 changes to "stopping". Thereafter, the character string on the inspection button 502 and the inspection status 503 toggle between the two when the inspection button 502 is pressed. In FIG. 5, "inspection in progress" is illustrated.

The inspection status screen 501 displays, in real time during the inspection, the number of sheets inspected, the number of sheets with fail for the inspection result, the failure rate, and the number of times the cause for the fail for the inspection result has occurred. Note that "error" displayed in the inspection status screen 501 is the number of times that the inspection apparatus 108 timed out because the inspection did not finish within a predetermined inspection time, resulting in the determination of an error, which corresponds to a fail for the inspection result.

Each time a fail for the inspection result occurs, the number of the sheet with a fail for the inspection result, information of whether the fail occurred for the front or back of the sheet, the cause of the fail for the inspection result, the inspection date and time, and a link to a failure details screen (not illustrated) are added to an inspection failure list 504.

When "details" of the detailed display is pressed, the display unit 245 displays a screen where the captured image with a fail for the inspection result, the defect position, and the like, can be viewed. In this example, causes for a fail for the inspection result include misalignment, circular defect, linear defect, and the like. In regards to when comparing the scanned image and the reference image, misalignment is a defect where all or a portion of the image is misaligned overall, circular defect is a state where a circular mark is formed on only the scanned image side, and linear defect is when a mark is formed on only the scanned image side as a streak or a line. The inspection apparatus 108, in this manner, can identify the type of the detected defect from the characteristics of the defect and display this in the inspection failure list 504. Note that this is merely an example, and the types of defects detectable by the inspection apparatus 108 are not limited thereto. For example, when an image is only on the reference image side and all or a portion of the image is not on the scanned image side, this may be determined as image omission and added as a fail for the inspection result.

Next, the processing which is an advantage of the first embodiment will be described with reference to the flowchart.

Note that the program of the printing apparatus 101 according to the present flow is stored in the storage unit 205 of the printing apparatus 101, loaded on the RAM 202, and executed by the CPU 201. Also, the program of the inspection apparatus 108 according to the present flow is stored in the storage unit 228 of the inspection apparatus 108, loaded on the RAM 227, and executed by the CPU 226. Also, the program of the information processing apparatus 109 according to the present flow is stored in the storage unit 236 of the information processing apparatus 109, loaded on the RAM 235, and executed by the CPU 234. Also, the program of the client computer 110 according to the present flow is stored in the storage unit 244 of the client computer 110, loaded on the RAM 242, and executed by the CPU 243.

FIGS. 10A to 10E are diagrams illustrating examples of the reference image and content information generated according to the first embodiment.

In the first embodiment, the information processing apparatus 109 or the printing apparatus 101 transmit the reference image and the content information to the inspection apparatus 108 as inspection data. As described above, if the inspection method is a scan inspection, a reference image 1001 is a scanned image of a printed material, and, if the inspection method is a RIP inspection, the reference image 1001 is a RIP image used in printing by the printing apparatus 101.

In the case of a scan inspection, the image data obtained by scanning a printed material via the CIS 315 and the CIS 316 of the inspection unit 106 is image data represented by digital signals with eight bits per pixel. In the case of a RIP inspection, the printing apparatus 101 receives characters described in PDL or image data from the information processing apparatus 109, and the CPU 201 executes RIP processing to generate a RIP image (bitmap image). In the case of an RIP inspection, the reference image is data represented by digital signals with eight bits per pixel generated via RIP processing. The printing apparatus 101 executes printing using the RIP image.

In the first embodiment, the PDL data the printing apparatus 101 receives includes linear or circular vector graphics 1005, a bitmap image or a raster image 1006, and text 1007, as illustrated in the example in FIG. 10A. These are each rendered by different PDL commands, and the printing apparatus 101 holds an image area flag for each pixel for determining what additional image processing is added before printing for the RIP image obtained after RIP processing is executed to develop the raster image from a PDL command. The image area flag indicates the PDL command used to generate an image object, such as a line, text, and the like. In the first embodiment, these image area flags are used as content types to determine the inspection region. In the first embodiment, the three types of image area flags are graphics, image, and text.

In the first embodiment, the information processing apparatus 109 generates content information from the PDL data.

FIG. 10B is a diagram illustrating a portion (upper left portion of the reference image) of the content information. The content information is data with the image area flags generated by the PDL command represented as numbers 0, 1 (graphics), 2 (image), and 3 (text) and allocated (by content type) to each pixel and is the same size of the RIP image. The content types held by the inspection system are not limited to the three types, and, from the various types of print data including PDL data, new content other than the three types may be generated and defined as a content type.

FIG. 10B is a diagram illustrating the image area flags of a corner portion in the upper left of the reference image 1001 in FIG. 10A. The pixels of the portions with lines correspond to "1" indicating graphics, the pixels of other portions correspond to "0", and pixels of the image portions correspond to "2".

In the next example described below, a person's face is added as a content type. When printing a photo album of a sports day, a holiday, or the like, inspections may be executed for whether the skin color is as expected with a person's face being the inspection target, for whether unnecessary circular defects have been printed, or the like. In such cases, it is plausible that a face detection application is executed by the information processing apparatus 109, the extraction result is integrated into the content information, and the inspection apparatus 108 is activated. Also, in the case of a printed material such as a holiday photo album including a group photo of participants, many face regions are extracted, and switching between the respective inspection levels is not desirable. Thus, in the first embodiment, the CPU 234 runs a facial recognition application for the information processing apparatus 109 to extract the faces of people. In the first embodiment, the face detection application of the information processing apparatus 109 interprets the bitmap image of the print data and detects the face portion of people. Also, the information processing apparatus 109 and the inspection apparatus 108 cooperate, and the CPU 226 of the inspection apparatus 108 newly registers face of person as a content type according to a user input and allocates the number "4" to it. Furthermore, the CPU 234 of the information processing apparatus 109 generates the content information based on the image area flags. Next, the CPU 234 of the information processing apparatus 109 substitutes the pixels of a person's face extracted by the information processing apparatus 109 with the number "4". Then, the information processing apparatus 109 sends the content information generated in this manner to the inspection apparatus 108.

The CPU 226 of the inspection apparatus 108 records "face of person" as a content type in an inspection settings table 900 in FIG. 9A. Also, the CPU 226 displays the content type "face of person" on the interface illustrated in FIG. 8 using the inspection settings table 900 and determines the inspection level according to a user input. FIGS. 8 and 9A to 9E are described below in detail.

When an inspection is executed for a photo album of a sports day, holiday, or the like, where the faces of people are more important to the user than other inspection sections, the user sets the inspection level for the faces of people to a higher value than other content types. For example, the inspection level is set to "4". By newly registering a content type with the information processing apparatus 109 and the inspection apparatus 108 and setting the inspection level higher than other content types in this manner, an inspection can be automatically executed of important regions in accordance with the wishes of the user. By newly registering a content type in this manner, not only can the important regions be automatically inspected, but the inspection level can be lowered to allow the user's wishes of not having a region inspected to be fulfilled.

The inspection apparatus 108 determines a rectangular region including an image object generated by a PDL command as an inspection area as an inspection region for each content type. FIG. 10C is a magnified view of the upper left portion of FIG. 10A. The rectangular region for each content type is determined via the following process. For example, the CPU 226 of the inspection apparatus 108 extracts an independent region from the content information sent from the information processing apparatus 109 (white background portion in FIG. 10C). From the extracted region with the same content type "1", information of the start coordinates and the end coordinates of the line of the image object is obtained from the PDL command. In FIG. 10C, the information of the start coordinates and the end coordinates of the line of image object 1 and of the line of the image object 2 is illustrated. In a similar manner, the start coordinates and the end coordinates of the two image objects which are graphics with "1" for the content type are obtained. Next, from the start coordinates and the end coordinates of the four image objects, the minimum value for the X coordinates and the minimum value for the Y coordinates and the maximum value for the X coordinates and the maximum value for the Y coordinates are obtained.

Using the method described above, the CPU 226 of the inspection apparatus 108 obtains a rectangular region 1008 (start (1, 1) and end (12, 12)) including the image objects with the graphics content type as illustrated in FIG. 10D. For the rectangular region 1008, the start coordinates are obtained from the minimum value for the X coordinates and the minimum value for the Y coordinates and the end coordinates are obtained from the maximum value for the X coordinates and the maximum value for the Y coordinates.

The CPU 226 of the inspection apparatus 108 obtains a rectangular region for each content type from the content information sent from the information processing apparatus 109 and generates a rectangular region from the top to the bottom of the page.

FIG. 10E is a diagram illustrating content information 1002, and, in this example, the inspection region for each content type is illustrated. In FIG. 10E, the reference image 1001 includes four corner graphics portions 1008, 1009, 1014, and 1015, image portions 1010, 1012, and 1013, and a text portion 1011. In the first embodiment, the inspection apparatus 108 obtains the inspection regions for each content type from the reference image and the content information and uses them in inspections.

FIG. 6 is a flowchart for describing the processing when the inspection apparatus 108 according to the first embodiment registers a reference image. The flowchart in FIG. 6 follows the same flow for both scan inspections and RIP inspections. The processing illustrated in the flowchart is implemented by the CPU 226 executing a program loaded on the RAM 227.

First, in step S601, the CPU 226 receives a start image reading instruction from the user via the inspection button 502 on the screen in FIG. 5 displayed on the display unit 245 being pressed. Next, the processing proceeds to step S602, and the CPU 226 repeats the processing of steps S602 to S605 until a reference image for all sheets are stored. In step S603, when the inspection method is a scan inspection, the CPU 226 receives scanned image data, which is a reference image data candidate, obtained via scanning using the CIS 315 and the CIS 316 from the inspection unit 106 via the inspection apparatus I/F 215 and the inspection unit I/F 231. When the inspection method is a RIP inspection, image data, which is a reference image data candidate, generated prior to printing by the printing apparatus 101 is received via the inspection apparatus I/F 215 and the accessory I/F 208. Furthermore, at this time, the content information 1002 illustrated in FIG. 10E is received from the information processing apparatus 109, for example.

Next, the processing proceeds to step S604, and the CPU 226 registers the reference image data received in step S603 as the reference image in the RAM 227. The inspection method is the method selected in the inspection method settings portion 404 in FIG. 4A described above.

The processing according to the first embodiment described herein is for registering an appropriate reference image using a RIP image and a scanned image data on the basis of the information set on the inspection criteria screen 405 in FIG. 4C when the inspection method is a RIP inspection. The processing will be described below with reference to the flowchart in FIG. 7.

The processing then proceeds to step S605, and the CPU 226 repeats the processing of steps S602 to S605 until image reading of all of the sheets is completed. When image reading of all of the sheets is completed, the processing proceeds to step S606, and the CPU 226 of the inspection apparatus 108 receives an end image reading instruction from the user via the display unit 245.

Note that the example described here is an example, and a start image reading instruction from a user displayed on the display unit 245 of the inspection apparatus 108 may be automatically executed in cooperation with an instruction to start printing of the printing apparatus 101, the information processing apparatus 109, or the client computer 110, but is not limited thereto. Also, the end image reading instruction from the user in step S606 may be automatically executed in cooperation with the completion of printing by the printing apparatus 101, but is not limited thereto.

In another embodiment, when the inspection method is a scan inspection, for example, the inspection apparatus 108 may read a plurality of images from the same page and register a combined result as the reference image.

FIG. 7 is a flowchart for describing the inspection processing executed by the inspection apparatus 108 according to the first embodiment. The processing illustrated in the flowchart is implemented by the CPU 226 executing a program loaded on the RAM 227.

In step S701, the CPU 226 receives the operation mode and the recovery mode settings set in the operation mode setting portion 402 and the recovery mode setting portion 403 in FIG. 4A. Also, the CPU 226 receives the inspection method set in the inspection method settings portion 404. Next, the processing proceeds to step S702, and the CPU 226 receives a start image reading instruction from the user via the display unit 245. Next, the processing proceeds to step S703, and if there is a sheet which is an inspection target, the CPU 226 proceeds the processing to step S704.

In step S704, the CPU 226 receives the image data obtained via scanning using the CIS 315 and the CIS 316 via the inspection unit I/F 231 and the inspection apparatus I/F 215. The image data is data obtained via scanning a printed material printed according to a print job for generating a product. The inspection apparatus 108 executes an inspection by comparing the scanned image data and the reference image determined in advance via the flowchart in FIG. 5. In step S705, the CPU 226 reads the reference image of the corresponding page registered in step S604 from the RAM 227. The reference image is obtained according to the inspection method selected in the inspection method settings portion 404.

Next, the processing proceeds to step S706, and the CPU 226 compares the reference image obtained in step S705 and the inspection target scanned image data received in step S704. The comparison operation includes first uses the feature points of the image as reference points for positional alignment and aligns the image position of the inspection target scanned image data with the reference image. Next, regarding the inspection target scanned image data, the four corners of the sheet and the reference points for positional alignment of the scanned image data are analyzed, and whether there is image misalignment with respect to the sheet is detected. Then, the density values of each region of the reference image and the inspection target scanned image data are compared per pixel. If no difference is detected between the scanned image data and the result, the result of the inspection is a pass. On the other hand, if a difference is detected, the inspection result is a fail, and the details of the fail for the inspection result as described using FIG. 5 are record according to the type of defect. Note that herein, the basic inspection operations are described, and thus, in the case described, a difference detection always results in a fail for the inspection result.

Next, the processing proceeds to step S707, and the CPU 226 determines whether or not the inspection has been completed within a specified amount of time. When the inspection has been completed in time, the processing proceeds to step S708, and when the inspection is not completed in time, the processing proceeds to step S709. This determination is executed because unless the inspection is completed and an inspection result is output within a certain amount of time, there is not enough time for the subsequent sheet to be scanned by the CIS 315 and the CIS 316 and the scanned image data to be obtained via the inspection unit I/F 231 and the inspection apparatus I/F 215. This is also so that, when purge mode is selected in the operation mode setting portion 402, the CPU 221 of the large-capacity stacker 107 can switch the conveying destination so that the inspection apparatus 108 discharges sheets with fail for the inspection result to the top tray 320. The CPU 226 of the inspection apparatus 108 needs to notify the CPU 221 of the large-capacity stacker 107 of a fail for the inspection result via the inspection unit I/F 231, the inspection apparatus I/F 215, the accessory I/F 214, and the accessory I/F 220 before the sheet arrives at a point where the conveying destination for the sheet can no longer be switched.

Accordingly, when inspection cannot be completed within a predetermined amount of time, the inspection result cannot be determined to be a pass. Thus, the CPU 226 of the inspection apparatus 108 determines the inspection result to be an error and determines the result for the sheet to be equivalent to a fail for the inspection result.

In step S708, the CPU 226 determines whether or not the inspection result is a fail. When the inspection result is fail, the processing proceeds to step S709, and, when not a fail, the processing proceeds to step S716. In step S709, the CPU 226 reads out the operation mode stored in the RAM 227. Then, the CPU 226 determines whether or not the operation mode is purge mode. When the operation mode is purge mode, the processing proceeds to step S710, and, when not purge mode, the processing proceeds to step S715. In step S710, the CPU 226 notifies the CPU 216 of the inspection unit 106 of a fail for the inspection result via the inspection unit I/F 231 and the inspection apparatus I/F 215.

Next, the processing proceeds to step S711, and the CPU 226 determines whether or not the recovery mode read out from the RAM 227 is "recovery mode" indicating a mode with recovery. When it is recovery mode, the processing proceeds to step S712, and, when it is the mode without recovery, the processing proceeds to step S715. In step S712, the CPU 226 waits until stop printing information is received from the CPU 216 of the inspection unit 106 via the inspection unit I/F 231 and the inspection apparatus I/F 215. In step S712, when the CPU 226 receives the stop printing information, the processing proceeds to step S713.

In step S713, the CPU 226 reads out the reference image corresponding to the sheet with a fail for the inspection result from the RAM 227 and holds it as the next image to be inspected. Next, the processing proceeds to step S714, and the CPU 226 notifies the CPU 216 of the inspection unit 106 of an inspection restart via the inspection unit I/F 231 and the inspection apparatus I/F 215. Then, the processing proceeds to step S715, and the CPU 226 adds information relating to the sheet with a fail for the inspection result to the inspection failure list 504. Next, the processing proceeds to step S716, and the CPU 226 repeats steps S703 to S716 until inspection of all of the sheets is complete. In this manner, when inspection of all of the sheets is complete, the processing proceeds to step S717, and the CPU 226 receives an end image reading instruction from the user via the inspection button 502 on the screen in FIG. 5.

Note that the example described here is an example, and a start image reading instruction from a user via the display unit 245 may be automatically executed in cooperation with an instruction to start printing of the printing apparatus 101, the information processing apparatus 109, or the client computer 110, but is not limited thereto. Also, the end image reading instruction from the user via the display unit 245 may be automatically executed in cooperation with the completion of printing by the printing apparatus 101, but is not limited thereto.

FIG. 8 is a diagram illustrating an example of an inspection level settings screen 800 for setting the inspection level of the content types when the inspection apparatus 108 according to the first embodiment executes an inspection.

FIGS. 9A to 9E are diagrams illustrating examples of the inspection settings table 900, an inspection level table 901, and inspection region settings tables 902, 903, and 904 stored in the storage unit 228 of the inspection apparatus 108 according to the first embodiment.

The inspection level settings screen 800 in FIG. 8 includes a content type 801 and an inspection level 802. In the first embodiment, the content types include three types, graphics, image, and text. However, the content types are not limited to three types, and content other than the three types described above indicating print data content may be used. In the example in FIG. 8, the inspection levels for text, graphics, and image are set to 1, 2, and 3, respectively. The user sets the inspection level for each content type on the screen and presses an OK button 804 to set the inspection level for each content type. A cancel button 803 cancels the setting on the screen.

FIG. 9A illustrates the inspection settings table 900, and the inspection level for each content type to be used when the inspection apparatus 108 executes an inspection is registered according to user input. The inspection level for each content type set by the user on the screen in FIG. 8 is stored in the inspection settings table 900.

FIG. 9B illustrates the inspection level table 901. The inspection level table 901 includes an inspection level 907 and a defect threshold 908. The threshold 908 for the inspection set for each inspection level is stored by the CPU 226 of the inspection apparatus 108 in the inspection level table 901 according to a user input. The table 901 stores the inspection level and thresholds used in the inspection for circular defects, linear defects, and misalignment. In the first embodiment, these can be set for each inspection level on the settings screen for the inspection criterion described above using FIG. 4C.

FIG. 9C is a diagram illustrating an example of the inspection region settings table 902. The inspection region settings table 902 include a region 909 and a content type 910. In step S603 of the flowchart in FIG. 6, the CPU 226 receives the content information 1002 via the inspection unit I/F 231 from the information processing apparatus 109 via the printing apparatus 101. In another embodiment, the inspection apparatus 108 may include an NWI/F, and the information processing apparatus 109 may communicate with the inspection apparatus 108 via this NWI/F and the NWI/F 237 to obtain the content information 1002.

Also, in the flowchart of FIG. 12A described below, the CPU 226 extracts a region for each content type included in the content information 1002 and stores the inspection level set in the inspection apparatus 108 in the inspection region settings table 902. The region 909 in FIG. 9C is a name for making it easy for the user to know the region for each content type on the user interface screen in FIG. 11 described below. The content information according to the first embodiment includes all three content types, and thus the inspection region settings table 902 in FIG. 9C is displayed with three rows. For example, when only image and text are the content types of the content information, these are stored in two rows.

FIG. 11 is a diagram illustrating an example of a screen 1100 for showing the user the inspection regions for the inspection apparatus 108 according to the first embodiment.

The display unit 245 of the inspection apparatus 108 displays the screen 1100 in step S1210 when the flowchart in FIG. 12A described below is executed. The screen 1100 includes an inspection region 1101 illustrated on the left side of the screen and detailed information 1102 illustrated on the right side of the screen. The inspection region 1101 is obtained from the content information 1002 according to the flowchart described below in FIG. 12A. The display unit 245 displays the rectangular regions (with information indicating the region) extracted for each content type included in content information. At this time, the inspection apparatus 108 displays the reference image together with the inspection region.

A number "3" 1108 indicates the page number of the displayed print data. When arrow buttons 1107 and 1109 are pressed, the inspection region and the reference image on the previous page or next page, depending on the arrow button, is displayed.

An inspection region settings list 1111 includes a list with the inspection level of the inspection region 1101 displayed for each region. At this time, the inspection region settings table 902 stored in the storage unit 228 is displayed on the display unit 245. So that, when in the inspection region 1101 the regions displayed in the inspection region settings list 1111 at this time are displayed, can be known, the rectangular regions of the inspection region 1101 and the regions for each content type of the inspection region settings are associated together and displayed using color or line type. For example, the image region 1106 of the inspection region settings and a rectangular region 1105 of the image of the inspection region sharing the same content type have the same line type and color. When the rectangular region 1105 of the inspection region is selected, the corresponding row of the image region in the inspection region settings list 1111 may be highlighted.

The inspection region can be automatically set as illustrated in FIG. 11 by the user setting the inspection level for each content type in advance in the inspection settings. If the settings of the inspection region 1101 are as per the user's wishes, an OK button 1103 is pressed and the inspection application execution screen illustrated in FIG. 5 is transitioned to. When a cancel button 1104 is pressed, a not-illustrated reference image is stored in list for storing and the inspection is cancelled.

FIG. 12A is a flowchart for describing the processing when setting the inspection region is executed by the inspection apparatus 108 according to the first embodiment. The flowchart in FIG. 12A is executed after the reference image registering processing in FIG. 6 is complete and before the inspection processing illustrated in the flowchart in FIG. 7 starts. Note that the processing illustrated in the flowchart is achieved by the CPU 226 executing a program loaded on the RAM 227.

First, in step S1201, the CPU 226 reads the inspection settings table 900 stored in the storage unit 228 of the inspection apparatus 108 and obtains the content types and corresponding inspection levels. Next, the processing proceeds to step S1202, and the CPU 226 obtains the content information received after step S601. The information processing apparatus 109 and the inspection apparatus 108 communicate with one another, and any of the content types set in advance in the inspection settings are in the content information. Next, in steps S1203 and S1204, the CPU 226 reads the content information to the end, scans each page from top to bottom, and extracts independent regions on the basis of the content information. The details are as per the extraction method described with reference to FIGS. 10A to 10E. By extracting regions from the content information to the very end in this manner, for example, the content information 1002 such as that illustrated in FIG. 10E is obtained. Then the processing proceeds to step S1208. In step S1208, the CPU 226 associates the extracted regions with the inspection level using the content types of the inspection settings.

In the first embodiment, when the CPU 226 stores regions in the inspection region settings table 902, the CPU 226 assign a name, such as "image region", "graphics region", and "text region" to the image, graphics, and text regions in the region column. The inspection levels of the regions of the inspection region settings table 902 of the storage unit 228 corresponds to a display of the inspection level of the regions of the content included in the content information. In the first embodiment, via the detailed information 1102 in FIG. 11, the user can change the inspection level of the content of the content information for each content.

Next, in steps S1209, S1210, and S1211, the CPU 226 repeats processing until the region information and the inspection region settings are read to the end, and the region information and the inspection region settings are displayed as the screen 1100 such as illustrated in FIG. 11, for example. This ends the description of FIG. 12A.

Next, the inspection processing executed in step S706 in FIG. 7 will be described with reference to the flowchart in FIG. 15 on the basis of the foregoing.

FIG. 15 is a flowchart for describing the processing when inspection is executed by the inspection apparatus 108 according to the first embodiment comparing the inspection target image and the reference image. The processing corresponds to the processing of step S706 in FIG. 7.

First, in step S1501, the CPU 226 obtains the region information and the inspection region settings of the reference image. Then, in steps S1502 to S1507, processing is repeated until the inspection of all of the region information and the inspection region settings of the reference image is complete. In step S1503, the CPU 226 compares the inspection target region of the reference image and the corresponding region in the inspection target received image. At this time, the inspection level corresponding to the region is read out from the RAM 227 or the storage unit 228, and whether or not the difference between the inspection target region of the reference image and the corresponding region of the inspection target received image satisfies the inspection level is determined. In other words, when the difference satisfies the threshold of the inspection level, the processing proceeds to step S1505 and as an inspection pass proceeds to step S1507. Also, the processing proceeds to step S1502, the next region information is obtained, and steps S1503 and S1504 are executed. Then, when the results of all of the inspections to the final region are all an inspection pass, the processing proceeds to step S1508 and with an inspection target received image inspection result of a pass, the processing ends.

On the other hand, in step S1504, when the difference does not satisfy the corresponding inspection level, the processing proceeds to step S1506, an inspection result of fail is determined, and the inspection result is stored with the failed region together with the information. Then, the processing proceeds to step S1508 and with an inspection target received image inspection result of a fail, the processing ends.

Note that, in this embodiment, if even one region does not satisfy the inspection level, a fail is determined. However, in another embodiment, fail for the inspection result is not immediately determined for each the region and inspection of subsequent regions is continued so that finally the ratio of regions determined to be a fail or the importance of a region, for example, is used to determine the inspection target received image inspection result.

According to the first embodiment described above, the inspection apparatus can extract independent regions on the basis of the content information and automatically set the inspection level on the basis of the content type. This means that the user does not have to manually set the inspection regions for the scan inspection or RIP inspection. Also, the amount of time required for setting the inspection regions and inspection levels when there are many inspection regions can be reduced.

Second Embodiment

In the method according to the first embodiment described above, the inspection region is automatically set from the content type using the inspection settings table 900 set in advance in the inspection apparatus 108. In the first embodiment, the inspection level is set for each content type included in the content information. However, regarding regions the user wishes to be inspected, there is a demand for different independent regions with the same content type to be able to be allocated with different inspection levels.

Thus, in the second embodiment described herein, in generating the inspection region settings table 902, the inspection apparatus 108 can allocate an inspection level to independent regions as different regions. Note that the overall configuration of the system, the hardware configuration of the apparatuses, and the software configurations according to the second embodiment are the same as in the first embodiment described above, and thus a description thereof is omitted. The overall flow of the software processing is also basically the same as the flow described using FIGS. 6, 7, and 12A in the first embodiment, and thus description thereof is omitted.

The flow for allocating independent regions as different regions, which is an advantage of the second embodiment, will be described with reference to FIGS. 9D, 12B, and 13.

FIG. 12B is a flowchart for describing the processing executed by the inspection apparatus 108 according to the second embodiment in place of step S1204.

Figure 13A:
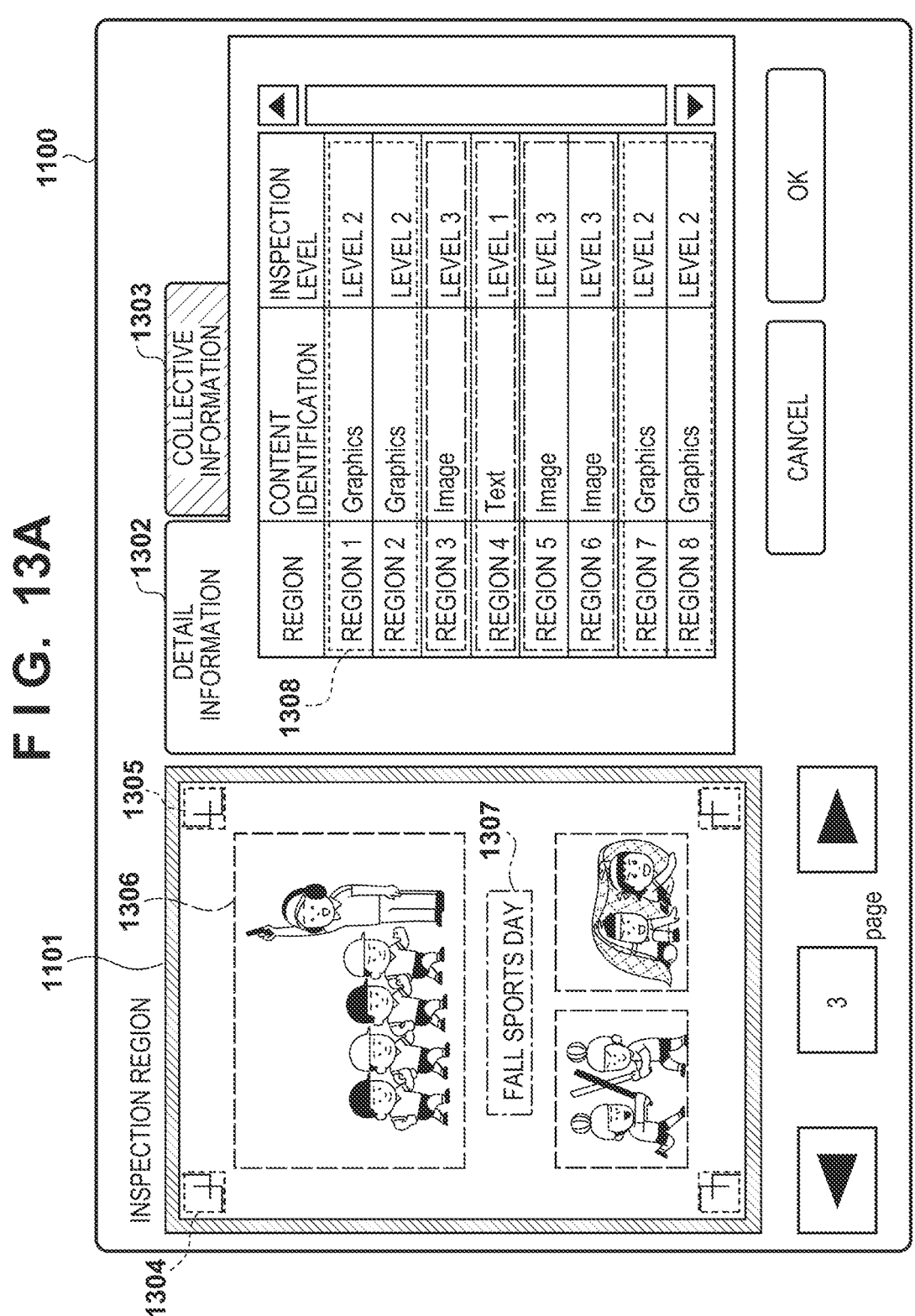

FIGS. 13A and 13B are diagrams illustrating examples of screens displayed to the user of a plurality of different inspection regions with the same content type by the inspection apparatus 108 according to the second embodiment. As illustrated in FIGS. 13A and 13B, the CPU 226 extracts different independent regions with the same content type as different regions to be displayed in the detailed information 1102.

In the example illustrated in FIG. 13A, a "region 1" 1304 with graphics as the content type and a "region 2" 1305 with graphics as the content type are different independent regions. Accordingly, the CPU 226 determines these as different regions and, as illustrated in FIG. 9D, stores "region 1" and "region 2" as different regions in the inspection region settings table 903.

In step S1213, the CPU 226 extracts the independent regions for each content type. Then, the processing proceeds to step S1205, and the CPU 226 gives the independent regions a number and stores the content type in the inspection region settings table 903.

In this case, in step S1210, the CPU 226 displays the region information with the independent regions with the same content type on the screen 1100 in FIG. 13A. Next, in step S1211, the CPU 226 displays the values of the inspection region settings table 903 of the storage unit 228 in inspection region settings 1308 in FIG. 13A.

Also, in the second embodiment described above, the different regions can separately set. However, the CPU 226 may collectively display the region information and the inspection region settings for each content type as illustrated in FIG. 13B in response to the user pressing a group information tab 1303.

According to the second embodiment described above, the inspection apparatus can extract different independent regions with the same content type on the basis of the content information and automatically set the inspection level on the basis of the content type. Also, in response to a user selection, the region information and the inspection region inspection level can be collectively displayed for each content type.

In addition to the effects of the first embodiment, this allows the user to set the inspection level for each different region even if they have the same content type.

Third Embodiment

In the second embodiment described above, using the inspection settings set in advance in the inspection apparatus 108, independent different regions with the same content type are extracted and the inspection level can be automatically set on the basis of the content type. Also, in the second embodiment, the inspection level is allocated and set for each different independent region included in the content information. However, where there are many regions with the same content type, the user may want to group the regions wished to be inspected in groups of a predetermined number or less.

Thus, in the third embodiment described herein, in generating the inspection region settings table, the inspection apparatus can group the independent regions by content type in groups of a predetermined number or less to prevent complication. The overall configuration of the system, the hardware configuration of the apparatuses, and the software configurations according to the third embodiment are the same as in the first embodiment described above, and thus description thereof is omitted. The overall flow of the software processing is also basically the same as the flow described using FIGS. 6, 7, and 12A in the first embodiment, and thus description thereof is omitted.

The flow for allocating independent regions as different regions, which is an advantage of the third embodiment, will be described with reference to FIGS. 9E, 12C, and 14.

FIG. 12C is a flowchart for describing the processing executed in place of step S1204 in the third embodiment.

FIGS. 14A and 14B are diagrams illustrating examples of a user interface screen displayed on the display unit 245 of the inspection apparatus 108 according to the third embodiment.

FIG. 14A is a diagram illustrating an example of a screen presented to the user where different rectangular regions are grouped by content type in groups of a predetermined number or less according to the third embodiment. FIG. 14B is a diagram illustrating an example of a user interface presented to the user of the maximum number for each content type group. The user can change the maximum number of content in each group via the user interface. In the third embodiment, the number of regions per group corresponding to each content type is this maximum number or less. In the example in FIG. 14B, the maximum number of regions per group is five for text, five for graphics, and five for image.

Next, an example of region information 1402 in FIG. 14A will be described. In step S1213 in FIG. 12C, the CPU 226 scans the content information from the upper left of the image from the top of the content information to the bottom for each print page and extracts independent regions corresponding to the content types. Next in step S1205, the CPU 226 assigns a region name with an allocated number to each extracted region and allocates a content type to each region. Then, the processing proceeds to step S1206, and the CPU 226 generates a region group 915 illustrated in FIG. 9E at the time when the content type switches. At this time, the region group includes the content type name and the region number, and the CPU 226, at the time when the content type switches, a content type name and a number+1 the region number last allocated are generated are stored in the region group 915 of the inspection region settings table 904 of FIG. 9E.

In the third embodiment, each time the content type switches, the CPU 226 stores the region number last allocated to the region group. The CPU 226 groups together and stores regions in the same region group until the region number last allocated to each content type, for example, the number of an image region, reaches a predetermined number for image set in FIG. 14B.

In step S1210, the CPU 226 displays the region information with the independent regions on the user interface screen in FIG. 14A. Next, in step S1211, the CPU 226 displays the values of the inspection region settings table 904 stored in the storage unit 228 in inspection region settings 1403 in FIG. 14A.

According to the third embodiment described above, the inspection apparatus can automatically set the inspection level for a group of a plurality of different regions with the same content type of a predetermined number or less. Accordingly, in addition to the effects of the first and second embodiments described above, the user can change the inspection level for each group formed by grouping of a plurality of different independent regions with the same content type in a predetermined number or less.

The effect according to the present invention includes making it unnecessary for the user to set the inspection regions or the inspection levels, allowing the inspection time to be reduced.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

23

What is claimed is:

1. An inspection system comprising:
a printing apparatus; and
an inspection apparatus that executes an inspection by comparing an image of a printed material printed by the printing apparatus and a reference image, the inspection apparatus comprising:
 one or more memory devices that store a set of instructions; and
 one or more processors that execute the set of instructions:
  to extract, from an image of the printed material, a region corresponding to a content type on a basis of content information of the reference image, the content type indicating attribution of an image of the printed material;
  to set an inspection level based on a corresponding type for each extracted region;
  to present, to a user, the extracted region and the set inspection level, associated with the reference image; and
  to inspect the extracted region using the reference image and the set inspection level.

2. The inspection system according to claim 1, wherein the one or more processors further execute the set of instructions in the one or more memory devices to store the content type and the inspection level corresponding to the content type, and to set, for the region, an inspection level corresponding to a content type of the extracted region on a basis of the content type and the stored inspection level.

3. The inspection system according to claim 2, wherein the one or more processors further execute the set of instructions in the one or more memory devices to set an inspection level corresponding to the content type, and to store the set inspection level.

4. The inspection system according to claim 1, wherein the one or more processors further execute the set of instructions in the one or more memory devices to present to a user the reference image provided with information indicating the region.

5. The inspection system according to claim 1, wherein the content information of the reference image is received from the printing apparatus that prints with a raster image developed from the reference image.

6. The inspection system according to claim 1, further comprising an information processing apparatus that transmits print data to the printing apparatus and causes the printing apparatus to print the print data,
wherein the content information of the reference image is received from the information processing apparatus which generates the print data of the reference image.

7. An inspection apparatus that executes an inspection by comparing an image of a printed material printed by a printing apparatus and a reference image, the inspection apparatus comprising:
 one or more memory devices that store a set of instructions; and
 one or more processors that execute the set of instructions:
  to extract, from an image of the printed material, a region corresponding to a content type on a basis of content information of the reference image, the content type indicating attribution of an image of the printed material;
  to set an inspection level based on a corresponding content type for each extracted region

24 to present, to a user, the extracted region and the set inspection level, associated with the reference image; and
  to inspect the extracted region using the reference image and the set inspection level.

8. The inspection apparatus according to claim 7, wherein the one or more processors further execute the set of instructions in the one or more memory devices to store the content type and the inspection level corresponding to the content type, and to set, for the region, an inspection level corresponding to a content type of the extracted region extracting unit on a basis of the content type and the stored inspection level.

9. The inspection apparatus according to claim 8, wherein the one or more processors further execute the set of instructions in the one or more memory devices to set an inspection level corresponding to the content type, and to store the inspection level.

10. The inspection apparatus according to claim 7, wherein the one or more processors further execute the set of instructions in the one or more memory devices to present, to a user, the reference image provided with information indicating the region.

11. The inspection apparatus according to claim 7, wherein the content information of the reference image is received from the printing apparatus that prints with a raster image developed from the reference image.

12. The inspection apparatus according to claim 7, wherein the content information of the reference image is received from the information processing apparatus that generates the print data of the reference image.

13. The inspection apparatus according to claim 7, wherein the one or more processors further execute the set of instructions in the one or more memory devices to assign a number to the extracted region, and to present the content type and the inspection level corresponding to a region with the number, associated with the number.

14. The inspection apparatus according to claim 7, wherein the one or more processors further execute the set of instructions in the one or more memory devices to present the region corresponding to the content type grouped as a single group.

15. The inspection apparatus according to claim 14, wherein the one or more processors further execute the set of instructions in the one or more memory devices to set a maximum number of the regions included in the single group, and to present, to a user, the region included in the single group numbering the maximum number or less.

16. An inspection apparatus that executes an inspection by comparing an image of a printed material printed by a printing apparatus and a reference image, the inspection apparatus comprising:
 one or more memory devices that store a set of instructions; and
 one or more processors that execute the set of instructions:
  to set a predetermined inspection level for a region corresponding to a predetermined content type in an image of the printed material on a basis of content information of the reference image, the content type indicating attribution of an image; and
  to inspect the region using the reference image and the set inspection level.

17. The inspection apparatus according to claim 16, wherein the predetermined content type is a face region.

18. The inspection apparatus according to claim 16, wherein the predetermined inspection level is a higher value than an inspection level of another content type.

19. A control method for controlling an inspection apparatus that executes an inspection by comparing an image of a printed material printed by a printing apparatus and a reference image, the control method comprising:

extracting, from an image of the printed material, a region corresponding to a content type on a basis of content information of the reference image, the content type indicating attribution of an image of the printed material;

setting an inspection level based on a corresponding content type for each extracted region;

presenting, to a user, the extracted region and the set inspection level, associated with the reference image; and inspecting the extracted region using the reference image and the set inspection level.

20. A non-transitory computer-readable storage medium storing a computer program for causing a computer to execute a control method for controlling an inspection apparatus that executes an inspection by comparing an image of a printed material printed by a printing apparatus and a reference image, the control method comprising:

extracting, from an image of the printed material, a region corresponding to a content type on a basis of content information of the reference image, the content type indicating attribution of an image of the printed material, setting an inspection level based on a corresponding content type for each extracted region, presenting, to a user, the extracted region and the set inspection level, associated with the reference image; and inspecting the extracted region using the reference image and the set inspection level.

* * * * *